(12) United States Patent
Kim et al.

(10) Patent No.: US 11,726,294 B2
(45) Date of Patent: *Aug. 15, 2023

(54) LENS DRIVING DEVICE, AND CAMERA MODULE AND OPTICAL INSTRUMENT COMPRISING SAME

(71) Applicant: LG INNOTEK CO., LTD., Seoul (KR)

(72) Inventors: Eun Mi Kim, Seoul (KR); Young Don O, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 179 days.

This patent is subject to a terminal disclaimer.

(21) Appl. No.: 17/222,321

(22) Filed: Apr. 5, 2021

(65) Prior Publication Data

US 2021/0223505 A1  Jul. 22, 2021

Related U.S. Application Data

(63) Continuation of application No. 16/848,054, filed on Apr. 14, 2020, now Pat. No. 10,996,427, which is a
(Continued)

(30) Foreign Application Priority Data

Nov. 2, 2015 (KR) .................. 10-2015-0153120

(51) Int. Cl.
*G02B 7/09* (2021.01)
*G02B 7/08* (2021.01)
(Continued)

(52) U.S. Cl.
CPC ............... *G02B 7/09* (2013.01); *G02B 7/08* (2013.01); *G02B 27/646* (2013.01); *G03B 3/10* (2013.01);
(Continued)

(58) Field of Classification Search
CPC .......... G02B 7/09; G02B 7/08; G02B 27/646; G03B 3/10; G03B 5/00; G03B 13/36;
(Continued)

(56) References Cited

U.S. PATENT DOCUMENTS 8,611,733 B2   12/2013   Ohishi
10,656,374 B2   5/2020   Kim et al.
(Continued)

FOREIGN PATENT DOCUMENTS

CN   1496112 A   5/2004
CN   103026295 A   4/2013
(Continued)

OTHER PUBLICATIONS

Notice of Allowance dated Apr. 1, 2021 in Chinese Application No. 201680067791.7.
(Continued)

*Primary Examiner* — Twyler L Haskins
*Assistant Examiner* — Fayez A Bhuiyan
(74) *Attorney, Agent, or Firm* — Saliwanchik, Lloyd & Eisenschenk

(57) ABSTRACT

An embodiment comprises: a housing a bobbin disposed inside the housing, and having a lens disposed thereon; a first coil disposed at the outer circumferential surface of the bobbin; a first magnet disposed at a size part of the housing in correspondence to the first coil; a first position sensor disposed in the bobbin, and including first and second input terminals and first and second output terminals; a circuit board including first and second terminals electrically connected to the first and second output terminals of the first position sensor; and a capacitor connected in parallel to the first and second terminals of the circuit board so as to remove noise from the output of the first position sensor.

20 Claims, 21 Drawing Sheets

Related U.S. Application Data continuation of application No. 15/772,378, filed as application No. PCT/KR2016/012206 on Oct. 28, 2016, now Pat. No. 10,656,374.

(51) Int. Cl.

| | |
|---|---|
| *G03B 3/10* | (2021.01) |
| *H04N 23/57* | (2023.01) |
| *H04N 23/67* | (2023.01) |
| *H04N 23/68* | (2023.01) |
| *G02B 27/64* | (2006.01) |
| *G03B 5/00* | (2021.01) |
| *G03B 13/36* | (2021.01) |
| *H04N 23/55* | (2023.01) |
| *H04N 23/60* | (2023.01) |

(52) U.S. Cl.
CPC ............... *G03B 5/00* (2013.01); *G03B 13/36* (2013.01); *H04N 23/57* (2023.01); *H04N 23/67* (2023.01); *H04N 23/682* (2023.01); *H04N 23/685* (2023.01); *H04N 23/6812* (2023.01); *G03B 2205/0007* (2013.01); *G03B 2205/0069* (2013.01); *H04N 23/55* (2023.01); *H04N 23/60* (2023.01)

(58) Field of Classification Search
CPC .... G03B 2205/0007; G03B 2205/0069; H04N 5/2257; H04N 5/23212; H04N 5/23258; H04N 5/23264; H04N 5/2328
See application file for complete search history.

(56) References Cited

U.S. PATENT DOCUMENTS

| | | | |
|---|---|---|---|
| 10,996,427 B2* | 5/2021 | Kim | ................ H04N 5/23264 |
| 2006/0028330 A1 | 2/2006 | Gallant et al. | |
| 2010/0202765 A1 | 8/2010 | Ohishi | |
| 2014/0285712 A1 | 9/2014 | Kim | |
| 2016/0377881 A1 | 12/2016 | Jung et al. | |

FOREIGN PATENT DOCUMENTS

| | | | |
|---|---|---|---|
| CN | 103529531 A | | 1/2014 |
| JP | 2007-60672 A | | 3/2007 |
| JP | 2008-051927 A | | 3/2008 |
| JP | 2013-024938 A | | 2/2013 |
| JP | 2013-33185 A | | 2/2013 |
| JP | 5447555 B2 | | 3/2014 |
| KR | 10-2009-0104428 A | | 10/2009 |
| KR | 10-2009-0124318 A | | 12/2009 |
| KR | 10-2012-0065492 A | | 6/2012 |
| KR | 10-2013-0029631 A | | 3/2013 |
| KR | 10-2013-0075682 A | | 7/2013 |
| KR | 10-2014-0111217 A | | 9/2014 |
| KR | 10-2015-0104703 A | | 9/2015 |
| WO | WO-2015/102382 A1 | | 7/2015 |

OTHER PUBLICATIONS

International Search Report in International Application No. PCT/KR2016/012206, filed Oct. 28, 2016.
Supplementary European Search Report dated Nov. 26, 2018 in European Application No. 16862344.5.
Non-Final Office Action dated Jun. 11, 2019 in U.S. Appl. No. 15/772,378.
Notice of Allowance dated Jan. 14, 2020 in U.S. Appl. No. 15/772,378.
Office Action dated Apr. 1, 2020 in Chinese Application No. 201680067791.7.
Office Action dated Sep. 21, 2020 in U.S. Appl. No. 16/848,054.
Notice of Allowance dated Jan. 6, 2021 in U.S. Appl. No. 16/848,054.
Office Action dated Sep. 14, 2022 in Korean Application No. 10-2015-0153120.

* cited by examiner

LENS DRIVING DEVICE, AND CAMERA MODULE AND OPTICAL INSTRUMENT COMPRISING SAME

CROSS-REFERENCE TO RELATED APPLICATIONS

This application is a continuation of U.S. application Ser. No. 16/848,054, filed Apr. 14, 2020; which is a continuation of U.S. application Ser. No. 15/772,378, filed Apr. 30, 2018, now U.S. Pat. No. 10,656,374, issued May 19, 2020; which is the U.S. national stage application of International Patent Application No. PCT/KR2016/012206, filed Oct. 28, 2016, which claims priority to Korean Patent Application No. 10-2015-0153120, filed Nov. 2, 2015, the disclosures of each of which are incorporated herein by reference in their entirety.

TECHNICAL FIELD

An embodiment relates to a lens drive unit, camera module including the same and optical instrument including the same.

BACKGROUND ART

As it is difficult to apply the technology of a voice coil motor (VCM) used for an existing general camera module to a subminiature camera module for low power consumption, many ongoing efforts are made to research and develop the subminiature camera module for low power consumption.

Regarding a camera module mounted on a compact electronic product such as a smartphone, impact may be frequently made on the camera module in the course of using such a product and the camera module may be minutely unstable due to user's hand shaking and the like during photographing. Considering such problems, many ongoing efforts are made to research and develop a technique of additionally installing a destabilization inhibiting means in a camera module.

DISCLOSURE OF THE INVENTION

Technical Task

The technical task of an embodiment is to provide a lens drive unit, camera module and optical instrument, by which noise due to crosstalk with a first coil is eliminated as well as feedback closed-loop performance of a first position sensor is improved.

Technical Solutions

In one technical aspect of an embodiment, provided herein is a lens drive unit, including a housing, a bobbin disposed within the housing so as to have a lens disposed therein, a first coil disposed on an outer circumference of the bobbin, a first magnet disposed on a lateral portion of the housing so as to correspond to the first coil, a first position sensor disposed on the bobbin, the first position sensor including first and second input terminals and first and second output terminals, a circuit board including first and second terminals electrically connected to the first and second output terminals of the first position sensor, and a capacitor connected in parallel to the first and second terminals of the circuit board to eliminate noise from an output of the first position sensor.

The circuit board may include a first wiring electrically connecting the first output terminal of the first position sensor to the first terminal and a second wiring electrically connecting the second output terminal of the first position sensor to the second terminal, one end of the capacitor may be connected to the first wiring, and the other end of the capacitor may be connected to the second wiring.

The capacitor may include a first conductive layer, a second conductive layer, and a first insulating layer disposed between the first and second conductive layers, and the first conductive layer, the second conductive layer and the insulating layer may be disposed in the circuit board. The lens drive unit may further include a resistor connected between one end of the capacitor and one of the first and second output terminals of the first position sensor.

The circuit board may further include third and fourth terminals electrically connected to the first and second input terminals of the first position sensor, a drive signal may be provided to the first position sensor via the third and fourth terminals, and an output signal of the first position sensor may be outputted via the first and second terminals.

The lens drive unit may further include an upper elastic member and a lower elastic member joined to the bobbin and the housing and a support member electrically connecting the upper elastic member and the circuit board, the first and second output terminals of the first position sensor may be electrically connected to the upper elastic member, and the support member may be electrically connected to the first wiring and the second wiring.

Capacitance of the capacitor may be 10 nF 50 nF.

The first position sensor may include an internal resistor and resistance of the internal resistor of the first position sensor may be 500 ohm (Ω)~1000 ohm (Ω).

The lens drive unit may further include a second coil disposed on the circuit board, a base disposed under the circuit board, and a second position sensor sensing strength of a magnetic field of the magnet according to a movement of the housing.

A drive signal including a PWM (pulse width modulation) signal may be applied to the first coil.

The lens drive unit may further include a sensor board disposed on the bobbin, the sensor board may include first and second elastic member contact portions electrically connected to the first and second output terminals of the first position sensor, the first and second elastic member contact portions may be electrically connected to the upper elastic member, and the capacitor may be disposed on the sensor board and connected in parallel to the first and second elastic member contact portions of the sensor board.

In another technical aspect of an embodiment, provided herein is a camera module, including a lens barrel, the aforementioned lens drive unit moving the lens barrel, an image sensor transforming an image incident through the lens drive unit into an electrical signal, and a first controller connected to the first and second terminals of the circuit board, the first controller including an amplifier amplifying an output signal of the first position sensor.

In another technical aspect of an embodiment, provided herein is a camera module, including a lens drive unit moving a lens barrel, an image sensor transforming an image incident through the lens drive unit into an electrical signal, a holder having the image sensor disposed thereon, and a first controller controlling the lens drive unit, the lens drive unit, including a housing, a bobbin disposed within the housing so as to have a lens disposed therein, a first coil disposed on an outer circumference of the bobbin, a first magnet disposed on a lateral portion of the housing so as to correspond to the first coil, a first position sensor disposed on the bobbin, the first position sensor including first and second input terminals and first and second output terminals, a circuit board including first and second terminals electrically connected to the first and second output terminals of the first position sensor, and a capacitor connected in parallel to the first and second terminals of the circuit board to eliminate noise from an output of the first position sensor.

The first controller may include an amplifier including first and second input terminals connected to the first and second terminals of the circuit board and an output terminal outputting an amplified signal according to a result from amplifying an output signal of the first position sensor, and the capacitor may be connected in parallel to the first and second terminals of the circuit board and the first and second input terminals of the amplifier.

The holder may include third and fourth wirings connecting the first and second terminals of the circuit board to the first and second input terminals of the amplifier, one end of the capacitor may be connected to the third wiring, and the other end of the capacitor may be connected to the fourth wiring.

Capacitance of the capacitor may be 10 nF 50 nF. The first position sensor may include an internal resistor and resistance of the internal resistor of the first position sensor may be 500 ohm (Ω)~1000 ohm (Ω).

The circuit board may include third and fourth terminals electrically connected to the first and second input terminals of the first position sensor, a drive signal may be provided to the first position sensor via the third and fourth terminals, and an output signal of the first position sensor may be outputted via the first and second terminals.

The drive signal provided to the first position sensor may be a PWM (pulse width modulation) signal and a frequency of the PWM signal may be 0.1 MHz~10 MHz.

In further technical aspect of an embodiment, provided herein is an optical instrument, including a display module including a plurality of pixels changing in color by an electrical signal, the aforementioned camera module transforming an image incident through a lens into an electrical signal, and a second controller controlling the display module and the camera module.

Advantageous Effects

According to an embodiment, noise due to crosstalk with a first coil can be eliminated and feedback closed-loop performance of a first position sensor can be improved.

BEST MODE FOR INVENTION

Figure 1:
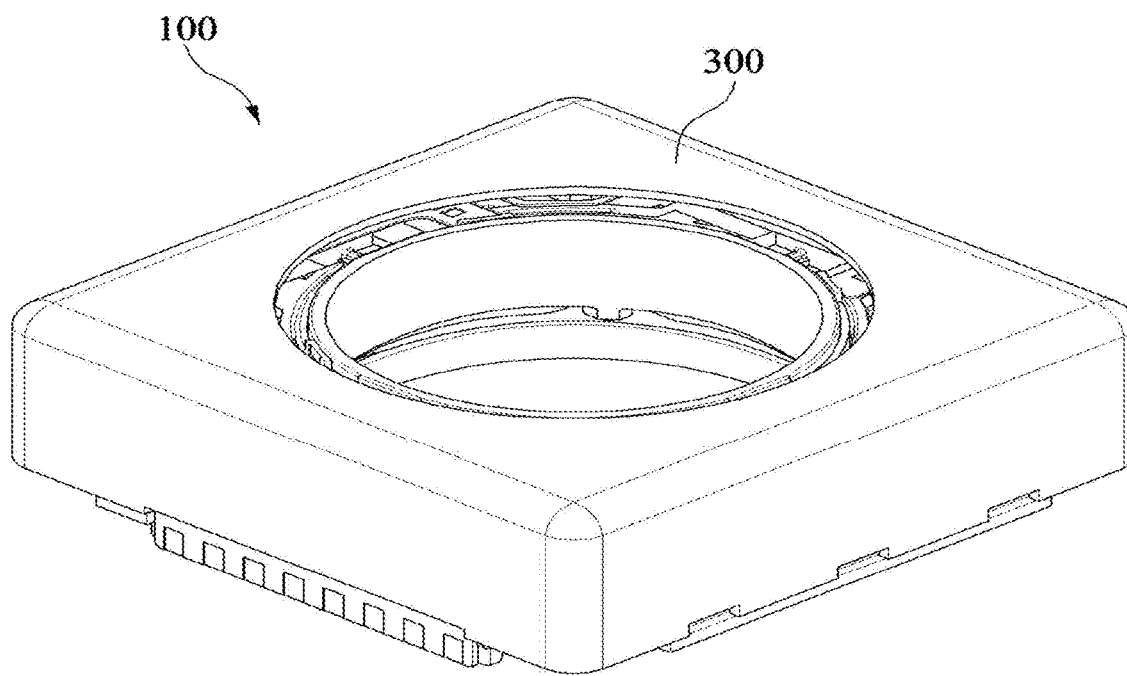
FIG. 1 is a perspective diagram of a lens drive unit according to an embodiment.
Figure 1:
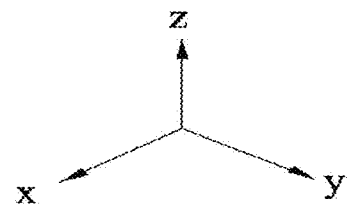

Reference will now be made in detail to the preferred embodiments, examples of which are illustrated in the accompanying drawings. In the following description of an embodiment, when layers (films), regions, patterns or structures are formed 'over/on' or 'below/under' a substrate, layers (films), region, pads or patterns, 'over/on' and 'below/under' include the meaning of forming 'directly' or 'by inserting another layer (indirectly'. Moreover, criteria of 'over/on' and 'below/under' shall be described with reference to the drawings.

For clarity and convenience of description, a size in the drawing is exaggerated, omitted or illustrated schematically. A size of each component may not reflect a real size completely. The same reference number indicates the same element through the description of the drawing.

A lens drive unit according to an embodiment is described with reference to the accompanying drawing as follows. For clarity of the description, a lens drive unit according to an embodiment is described using Cartesian coordinate system (x, y, z) and other coordinate systems are usable, by which the embodiment if non-limited. In each drawing, x-axis and y-axis mean directions vertical to z-axis that is an optical axis, respectively, a z-axis direction that is an optical axis direction may be named a first direction, an x-axis direction may be named a second direction, and a y-axis direction may be named a third direction.

An 'optical image stabilization device' applied to a compact camera module of a mobile device such as a smartphone, a tablet PC, or the like may means a device configured to inhibit an outline of a shot image from being blurred due to vibration generated from user's hand shaking in case of photographing a still picture.

An 'autofocusing device' is a device that automatically images a focus of a picture of a subject on an image sensor surface. The optical image stabilization device and the autofocusing device can be configured in various ways. A lens drive unit according to an embodiment can performs an optical image stabilization operation and/or an autofocusing operation in a manner of moving an optical module configured with at least one lens in a first direction parallel to an optical axis or moving the optical module for a plane formed by second and third directions vertical to the first direction.

Figure 2:
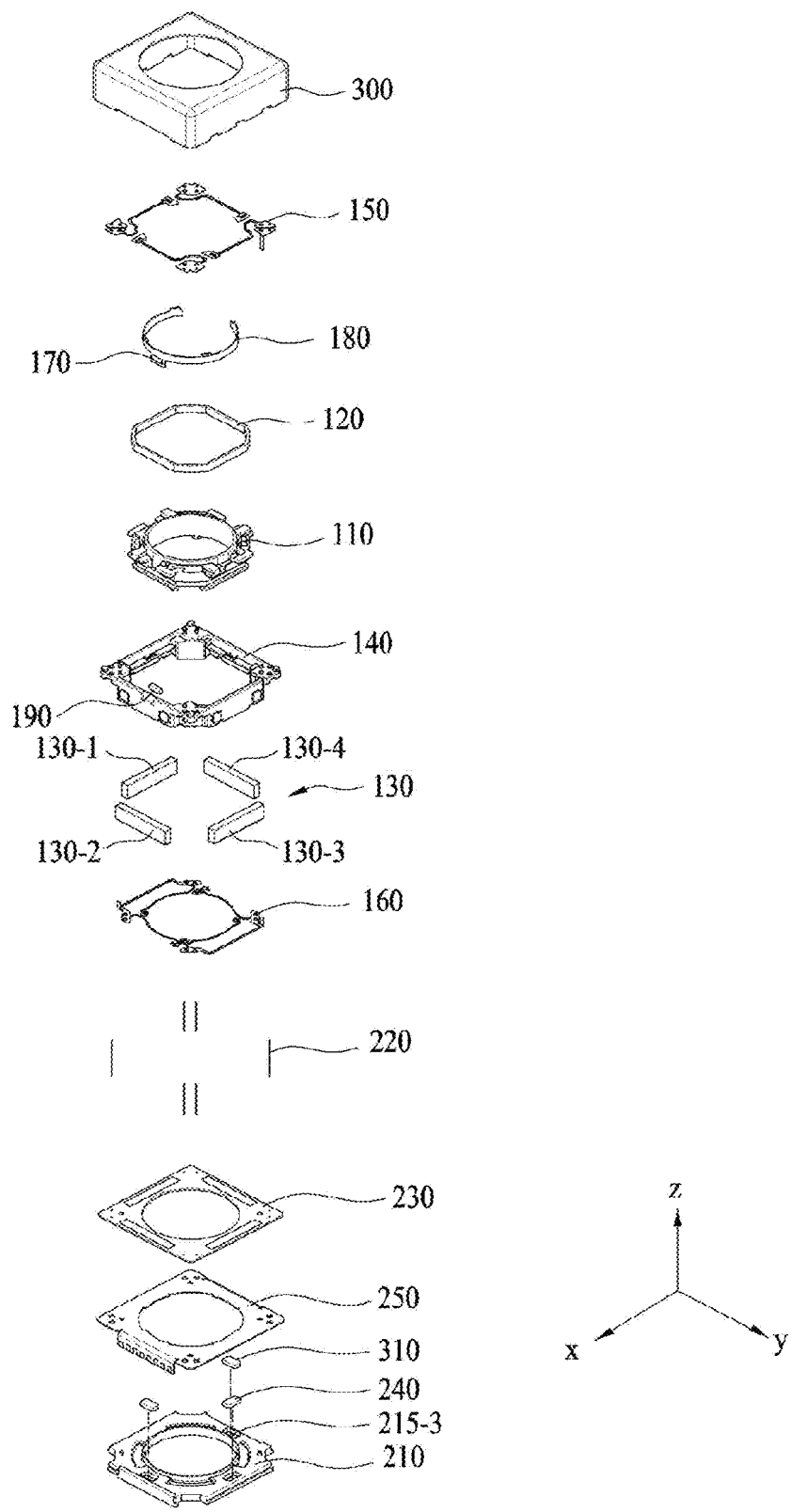
FIG. 2 is an exploded perspective diagram of the lens drive unit shown in FIG. 1.

FIG. 1 is a perspective diagram of a lens drive unit 100 according to an embodiment. FIG. 2 is an exploded perspective diagram of the lens drive unit 100 shown in FIG. 1.

Referring to FIG. 1 and FIG. 2, a lens drive unit 100 includes a cover member 300, an upper elastic member 150, a sensor board 180, a first position sensor 170, a first coil 120, a bobbin 110, a housing 140, a first magnet 130 (referred to as a moving magnet), a lower elastic member 160, a circuit board 250, a base 210 and a capacitor 310.

The lens drive unit 100 may further include a second magnet 190 (referred to as a sensing magnet).

The lens drive unit 100 may further include a plurality of support members 220, a second coil 230, and second position sensors 240 (240a and 240b).

First of all, the cover member 300 is described.

The cover member 300 receives the upper elastic member 150, the bobbin 110, the first coil 120, the housing 140, the second magnet 190, the first magnet, the lower elastic member 160, a plurality of the support members 220, the second coil 230, the circuit board 250 and the capacitor 310 in a receiving space formed with the base 210.

The cover member 300 may have a box shape including a top end portion and sidewalls by having an open bottom. A lower side of the cover member 300 can be joined to a upper side of the base 210. A shape of the upper side of the cover member 300 may include a polygonal shape such as quadrangle, octagon, etc.

A hollow for exposing a lens (not shown) joined to the bobbin 110 to external light may be provided to the upper side of the cover member 300. In order to inhibit particles (e.g., dust, moisture, etc.) from penetrating into the camera module, a window formed of light transmissive material may be additionally provided to the hollow of the cover member 300.

The material of the cover member 300 may include nonmagnetic material such as SUS or the like to inhibit the cover member 300 from sticking to the first magnet 130, but be formed of magnetic material to play a role as a yoke.

Figure 3:
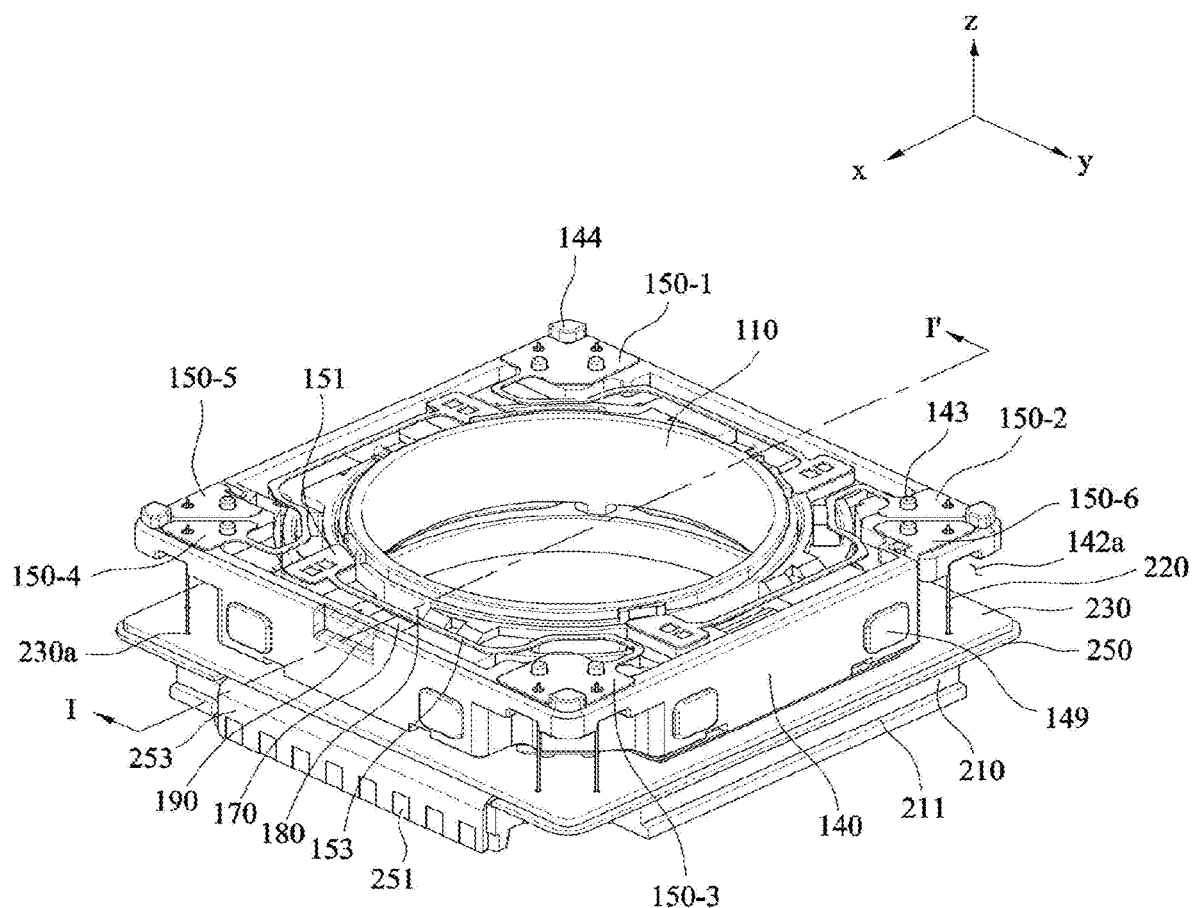
FIG. 3 is an assembled perspective diagram of a lens drive unit from which a cover member shown in FIG. 1 is removed.
Figure 4:
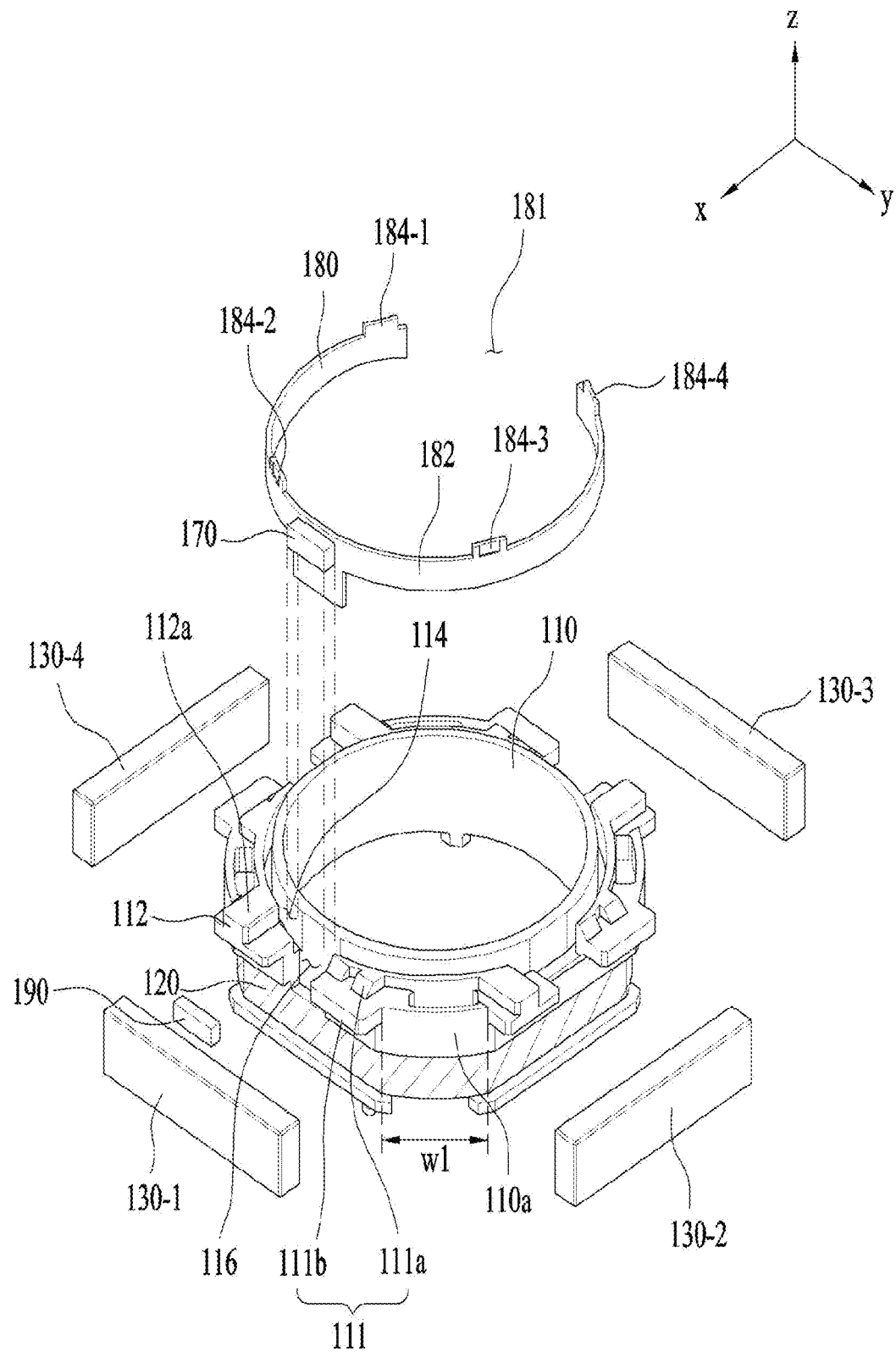
FIG. 4 is an exploded perspective diagram of a bobbin, first coil, first magnet, second magnet, first position sensor and sensor board shown in FIG. 1.

FIG. 3 is an assembled perspective diagram of the lens drive unit 100 from which the cover member 300 shown in FIG. 1 is removed. FIG. 4 is an exploded perspective diagram of the bobbin 110, the first coil 120, the second magnet 190, the first magnet 130-1 to 130-4, the first position sensor 170 and the sensor board 180 shown in FIG. 1.

The bobbin 110 is described as follows.

Referring to FIG. 3 and FIG. 4, the bobbin 110 is disposed inside the housing 140, and is movable in an optical axis direction or a first direction, e.g., a z-axis direction owing to electromagnetic interaction between the first coil 120 and the first magnet 130.

The bobbin 110 may include a lens barrel (not shown) having at least one lens installed therein, and the lens barrel may be joined to an inside of the bobbin 110 in various ways [not shown].

The bobbin 110 may have a structure that includes a hollow for the installation of the lens or the lens barrel. A shape of the hollow may include a circle, an oval, or a polygon, by which the shape is non-limited.

The bobbin 110 may include a first protrusion 111 and a second protrusion 112.

The first protrusion 111 of the bobbin 110 may include a guide portion 111a and a first stopper 111b.

The guide portion 111a of the bobbin 110 may play a role in guiding an installation location of the upper elastic member 150. For example, as shown in FIG. 3, the guide portion 111a of the bobbin 110 can guide a path for a first frame connecting portion 153 of the upper elastic member 150 to pass through.

For example, a plurality of the guide portions 111a may be formed in a manner of protruding in the second and third directions vertical to the first direction. Moreover, as shown in the example, the guide portion 111a may have a structure symmetric with respect to the center of the bobbin 110 in the plane formed by the x-axis and the y-axis, or an asymmetric structure in which interference with other parts is excluded unlike the example.

The second protrusion 112 of the bobbin 110 may be formed in a manner of protruding in the second and third directions vertical to the first direction. And, an upper surface 112a of the second protrusion 112 of the bobbin 110 may have a shape to enable a first inner frame 151 of the upper elastic member 150 to be seated thereon.

When the bobbin 110 moves in the first direction parallel to the optical axis or a direction parallel to the first direction for the autofocusing function, although the bobbin 110 moves over a prescribed range due to external shock or the like, the first stopper 111b of the first protrusion 111 and the second protrusion 112 in the bobbin 110 can play a role in inhibiting a body lower surface of the bobbin 110 from directly colliding with an upper surface of the circuit board 250. The bobbin 110 may include a support recess 114 provided between an inner circumference 110a and an outer circumference 110b of the bobbin 110 so as to enable the sensor board 180 to be inserted in the first direction (e.g., z-axis direction). For example, the support recess 114 of the bobbin 110 may be provided between the inner circumference 110a and the first and second protrusions 111 and 112 of the bobbin 110 so as to be inserted in the first direction (e.g., z-axis direction) of the sensor board 180. The support recess 114 may have a shape matching that of the sensor board 180. For example, the support recess 114 may have a ring shape, by which the embodiment is non-limited.

The bobbin 110 may include a recess 116 in which the first position sensor 170 disposed, joined or mounted on the sensor board 180 is received or disposed.

For example, the bobbin 110 may include the recess 116 provided to a space between the first and second protrusions 111 and 112 so as to enable the first position sensor 170 mounted on the sensor board 180 to be inserted in the first direction.

The bobbin 110 may have a support projection 117 (cf. FIG. 8) joined and fixed to the lower elastic member 160.

If a state that lower surfaces of the first and second protrusions 111 and 112 come in contact with a floor surface 146a of a first seat recess 146 of the housing 140 is set as an initial position of an AF moving unit, autofocusing of the lens drive unit 100 according to an embodiment enables a uni-directional control of a voice coil motor (VCM). Namely, when a drive signal, e.g., a drive current is supplied to the first coil 120, the bobbin 110 ascends. When the supply of the drive current is cut off, the bobbin 120 descends. Thus, the autofocusing function can be implemented.

Yet, if a location of the floor surface 146a of the first seat recess 146 is spaced apart by a predetermined distance from the lower surfaces of the first and second protrusions 111 and 112 is set as an initial position of the AF moving unit, autofocusing of the lens drive unit 100 according to an embodiment enables bi-directional control of the voice coil motor. Namely, the bobbin 110 can be controlled to move up or down in the first direction at the initial position of the AF moving unit. For example, if a forward drive current is applied to the first coil 120, the bobbin 110 can move up. If a reverse drive current is applied to the first coil 120, the bobbin 110 can move down.

For instance, the AF moving unit can include the bobbin 110 and the components (e.g., first coil 120, first position sensor 170, sensor board 180, etc.) joined to the bobbin 110. Moreover, the initial position of the AF moving unit may include an initial position of the bobbin 110 in a state that power is not applied to the first coil 120 or a position at which the AF moving unit is located as the top and lower elastic members 150 and 150 are elastically deformed by weight of the AF moving unit only.

The first coil 120 is described as follows.

The first coil 120 is disposed on the outer circumference 110a (cf. FIG. 4) of the bobbin 110.

For example, at the initial position of the AF moving unit (or, the bobbin 110), the first coil 120 can be disposed so as not to overlap with the first position sensor 170 in the second or third direction vertical to the first direction.

The first coil 120 and the first position sensor 170 can be disposed on an outer circumference 110a of the bobbin 110 by being spaced apart from each other so as not to interfere or overlap with each other in the second or third direction. For example, the first coil 120 may be disposed on a lower side or part of the outer circumference 110a of the bobbin 110 and the first position sensor 170 may be disposed over the first coil 120 by being spaced apart from the first coil 120.

The first coil 120 may be disposed or wound, as shown in FIG. 4, in a direction of rotating centering on the optical axis so as to enclose the outer circumference 110a of the bobbin 110.

The first coil 120 may be inserted, disposed, or fixed within a recess portion 118 (cf. 8) formed on the outer circumference 110a of the bobbin 110.

In FIG. 4, the first coil 120 may be directly disposed or wound on the outer circumference 110a of the bobbin 110, by which the present embodiment is non-limited. According to anther embodiment, the first coil 120 may be a coil ring type or include a coil block in an angulate ring shape. Here, the coil ring may be joined to the bobbin 110 in the same manner as the sensor board 180 is fixed by being fitted into the recess 114 of the bobbin 110.

Figure 5A:
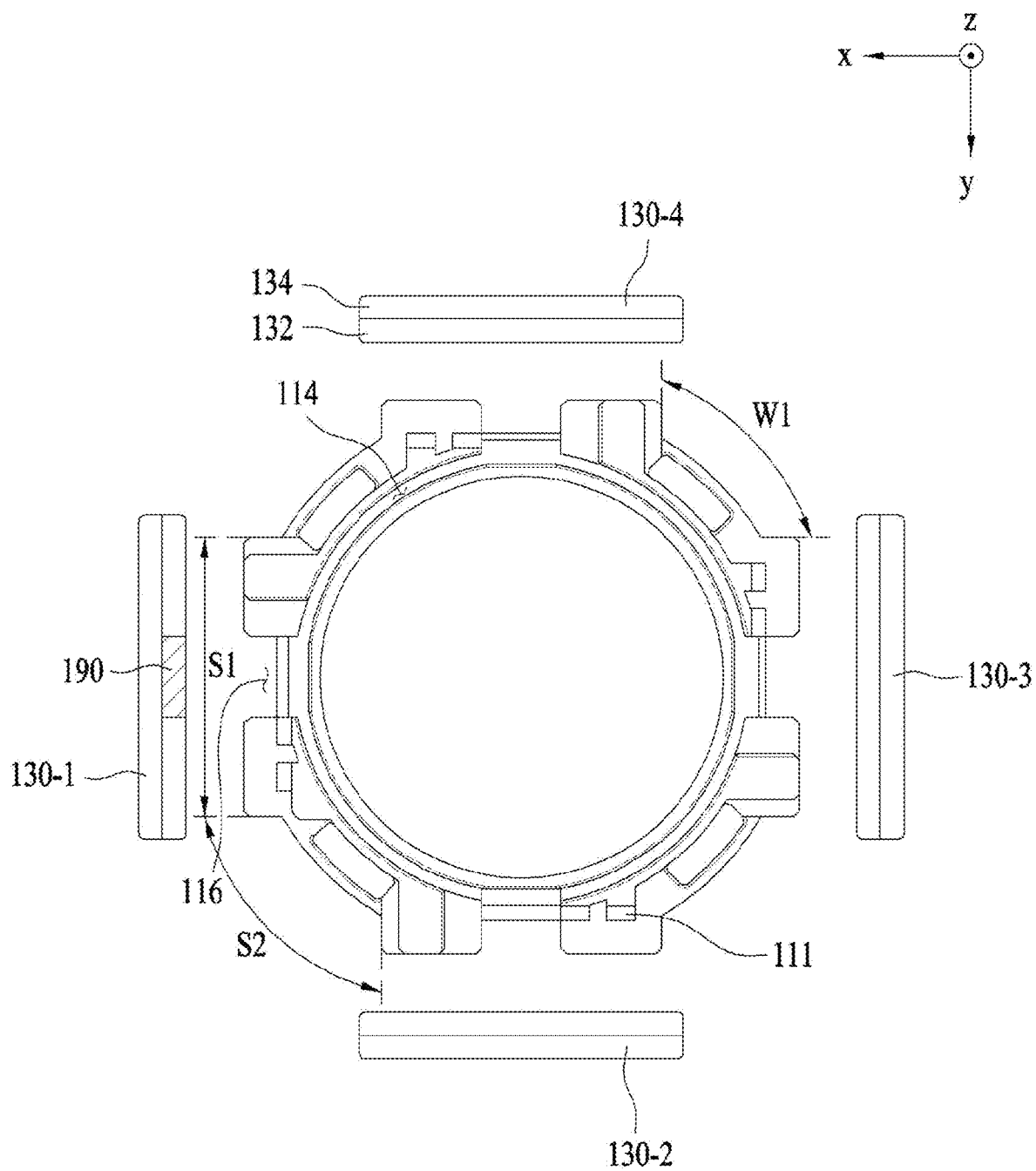
FIG. 5A is a layout of the bobbin and first magnet shown in FIG. 4.

The first coil 120, as shown in FIG. 2, may be formed in an approximately octagonal shape. Such a shape of the first coil 120 corresponds to a shape of the outer circumference of the bobbin 110. This is because the outer circumference of the bobbin 110, as shown in FIG. 5A, has an octagonal shape.

Moreover, at least 4 faces may be straight-lined and corners connecting such faces may be straight-lined as well, by which the embodiment is non-limited. Such faces and corners may be rounded.

A drive signal of an AC (alternate current) signal (e.g., alternate current) can be applied to the first coil 120 for AF drive. For example, a drive signal of the first coil 120 may include a sinusoidal signal or a pulse signal (e.g., PWM (pulse width modulation) signal).

According to another embodiment, drive signals applied to the first coil 120 may include an AC signal and a DC signal. For example, a frequency of a PWM signal may be equal to or greater than 20 KHz, or equal to or greater than 500 KHz for reduction of power consumption. For example, a frequency of a PWM signal may be 0.1 MHz~10 MHz.

If supplied with a drive signal, the first coil 120 can generate an electromagnetic force through electromagnetic interaction with the first magnet 130, and the generated electromagnetic force can move the bobbin 110 in the first direction.

The first coil 120 may be configured to correspond to the first magnet 130. As the first magnet 130 is configured as a single body, if a whole face confronting the first coil 120 is prepared as having the same polarity, a face of the first coil 120 corresponding to the first magnet 130 can be configured to have the same polarity as well. For example, current can flow in the same direction through the face of the first coil 120 corresponding to the first magnet 130.

As the first magnet 130 is partitioned into 2 or 4 parts as a face vertical to the optical axis, if a face confronting the first coil 120 is divided into two or more faces, the first coil 120 can be partitioned into parts of which number corresponds to the number of the partitioned first magnets 130 as well.

The first position sensor 170 and the sensor board 180 are described as follows.

The first position sensor 170 can be moved together with the bobbin 110 by being disposed, joined or mounted on the bobbin 110.

When the bobbin 110 110 moves in the optical axis direction, the first position sensor 170 can be moved together with the bobbin 110.

In case of an embodiment from which the second magnet 190 is omitted, the first position sensor 170 can sense the strength of a magnetic field of the first magnet 130 according to the movement of the bobbin 110, and is able to generate an output or sensing signal according to a result of the sensing.

In case of an embodiment having the first and second magnets 130 and 190 included therein, the first position sensor 170 can sense a sum of the strength of a magnetic field of the first magnet 130 and the strength of a magnetic field of the second magnet 190, and is able to generate an output or sensing signal according to a result of the sensing. Using the output signal of the first position sensor 170, displacement in the optical direction of the bobbin 110 or the first direction can be adjusted.

The first position sensor 170 can be electrically connected to the sensor board 180. The first position sensor 170 may be embodied as a driver type including a hall sensor, or may be independently embodied by a position detection sensor such as a hall sensor or the like.

The first position sensor 170 may be disposed, joined or mounted on the bobbin 110 in various forms. And, a drive signal can be applied to the first position sensor 170 according to a disposed, joined or mounted type of the first position sensor 170.

The first position sensor 170 may be disposed, joined or mounted on the outer circumference 110a of the bobbin 110.

For example, the first position sensor 170 may be disposed, joined or mounted on the sensor board 180. The sensor board 180 may be disposed, joined or mounted on the outer circumference 110a of the bobbin 110. Namely, the first position sensor 170 can be indirectly disposed, joined or mounted on the bobbin 110 through the sensor board 180.

The first position sensor 170 can be electrically connected to at least one of the upper elastic member 150 and the lower elastic member 160. For example, the sensor board 180 electrically connected with the first position sensor 170 can be electrically connected to at least one of the upper elastic member 150 and the lower elastic member 160. For example, the first position sensor 170 may be electrically connected to the upper elastic member 150.

Figure 5B:
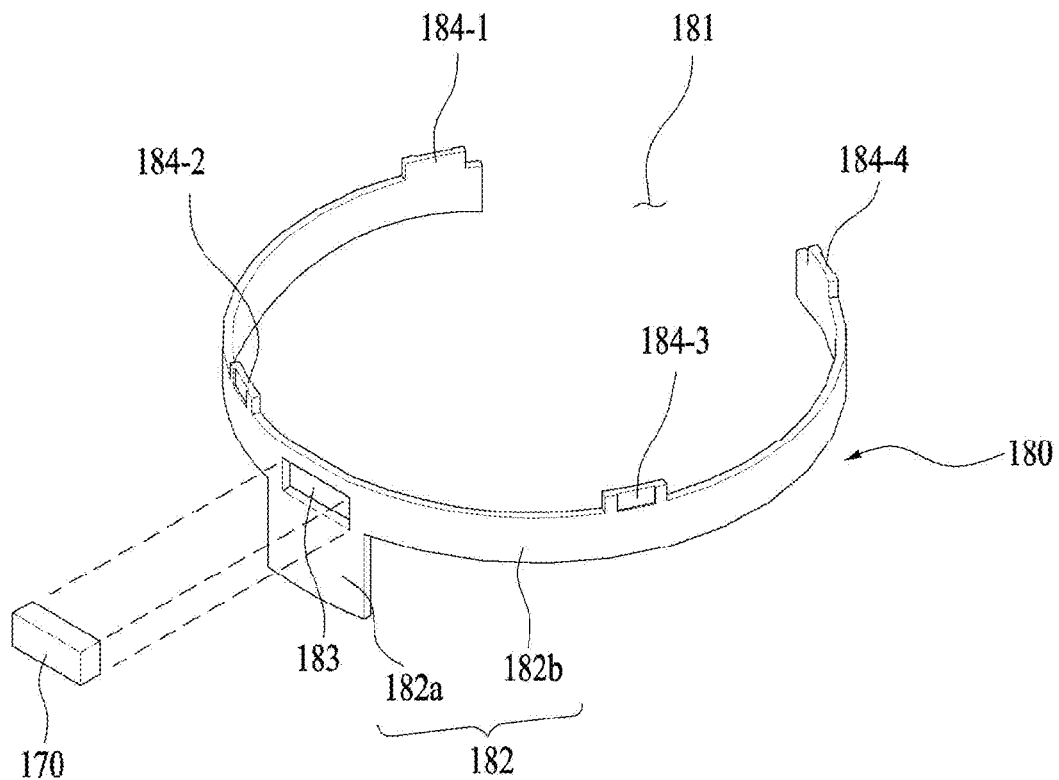
FIG. 5B is a disassembled perspective diagram of the sensor board and first position sensor shown in FIG. 4.
Figure 5C:
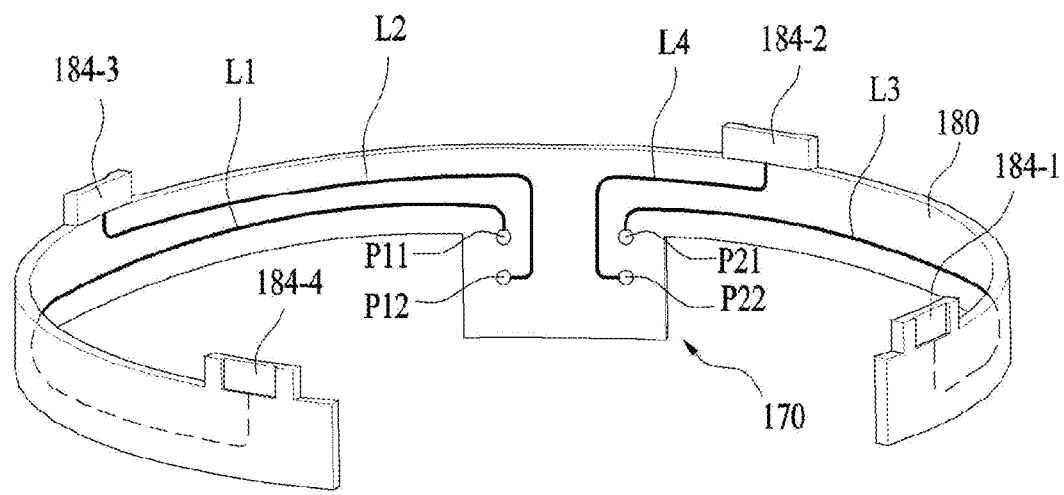
FIG. 5C is a rear perspective diagram of the sensor board shown in FIG. 4 according to one embodiment.

FIG. 5A is a layout of the bobbin 110 and first magnet 130 (130-1 to 130-4) shown in FIG. 4. FIG. 5B is a disassembled perspective diagram of the sensor board 180 and first position sensor 170 shown in FIG. 4. FIG. 5C is a rear perspective diagram of the sensor board 180 shown in FIG. 4 according to one embodiment.

Referring to FIG. 4 and FIG. 5A, the sensor board 180 is mounted on the bobbin 110 and can be moved together with the bobbin 110 in the optical direction or the first direction.

For example, the sensor board 180 can be joined to the bobbin 110 by being inserted or disposed in the recess 114 of the bobbin 110. The sensor board 180 is enough to be mounted on the bobbin 110. A ring shape of the sensor board 180 is exemplarily shown in FIG. 4, by which the embodiment is non-limited.

The first position sensor 170 can be supported by being attached to a front or upper side of the sensor board 180 using such an adhesive member as epoxy, double-sided tape, etc.

The outer circumference 110a of the bobbin 110 may include first lateral sides S1 corresponding to first lateral portions 141 of the housing 140, on which the first magnet 130 is disposed, and second lateral sides S2 disposed between the first lateral sides S1 so as to connect the first lateral sides S1 to each other.

The first position sensor 170 may be disposed on one of the first lateral sides S1 of the bobbin 110. For example, the recess 116 of the bobbin 110 may be provided to one of the first lateral sides S1 of the bobbin 110, and the first position sensor 170 can be inserted or disposed in the recess 116 of the bobbin 110. According to another embodiment, the first position sensor 170 may be disposed on one of the second lateral sides S2 of the bobbin 110.

Referring to FIG. 5B, the first position sensor 170 may be disposed, joined or mounted on one surface of the sensor board 180.

For example, the first position sensor 170 may be disposed on one surface of the sensor broad 180 so as to be located or aligned in a space between the first and second magnets 130 and 190 in the first direction at the AF moving unit, e.g., an initial position of the bobbin 110.

The first position sensor 170 can be electrically connected to wirings or circuit patterns L1 to L4 (cf. FIG. 5C) provided to the sensor board 180. And a drive signal can be externally applied to the first position sensor 170 through the sensor board 180.

The first position sensor 170 can be disposed on an upper part of one side of the sensor board 180 in order to be located distant from the first coil 120 disposed under the outer circumference 110a of the bobbin 110 as far as possible, whereby an effect of a magnetic field attributed to a drive signal applied to the first coil 120 is suppressed or relieved in a high frequency range. Thus, malfunction and error of the first position sensor 170 can be inhibited.

The sensor board 180 may include a body 182, elastic member contact portions 184-1 to 184-4 and circuit patterns L1 to L4. For example, the circuit patterns L1 to L4 may include wirings.

If the recess of the bobbin 110 has the same shape of the outer circumference 110a of the bobbin 110, the body 182 of the sensor board 180 inserted in the recess 114 of the bobbin 110 may have a shape capable of being inserted in and fixed to the recess 114.

As shown in FIGS. 3 to 5A, each of the recess 114 of the bobbin 110 and the body 182 of the sensor board 180 may have a shape of a circular plane, by which the embodiment is non-limited. According to another embodiment, each of the recess 114 of the bobbin 110 and the body 182 of the sensor board 180 may have a shape of a polygonal plane.

Referring to FIG. 5B, the body 812 of the sensor board 180 may include a first segment 182a having the first position sensor 170 disposed, joined or mounted thereon and a second segment 182b extending by being adjacent to the first segment 182a so as to be inserted in the recess 114 of the bobbin 110.

An opening 181 is provided to a portion of the sensor board 180 confronting the first segment 182a so as to facilitate the sensor board 180 to be inserted in the recess 114 of the bobbin 110. And, the embodiment is non-limited by a specific shape of the sensor board 180.

The elastic member contact portions 184-1 to 184-4 of the sensor board 180 can protrude from the body 182 of the sensor board 180, e.g., the second segment 182b in a direction contactable with the first inner frame 151, e.g., the optical axis direction or the first direction.

The elastic member contact portions 184-1 to 184-4 of the sensor board 180 may include a part to be connected or bonded to the first inner frame 151 of the upper elastic member 150. And, the number of the elastic member contact portions 184-1 to 184-4 may amount to 1 or more.

The circuit patterns L1 to L4 of the sensor board 180 are formed on the body 182 of the sensor board 180 and can electrically connect the first position sensor 170 to the elastic member contact portions 184-1 to 184-4.

For example, the first position sensor 170 may be provided as a hall sensor and employ any sensors capable of sensing strength of a magnetic field. If the first position sensor 170 is embodied by a hall sensor, the hall sensor may have a plurality of pins.

For example, a plurality of the pins may include input pins P11 and P12 and output pins P21 and P22. Signals outputted through the output pins P21 and P22 may be current or voltage types.

The input pins P11 and P12 and the output pins P21 and P22 of the first position sensor 170 can be electrically connected to the elastic member contact portions 184-1 to 184-4 through the circuit patterns L1 to L4, respectively.

For example, referring to FIG. 5C, the circuit patterns may include a plurality of lines L1 to L4. For example, a plurality of lines and a line may be referred to as a plurality of wirings and a wiring, respectively.

One end of each of a plurality of lines L1 to L4 may be connected or bonded to a prescribed one of the input pins P11 and P12 and the output pins P21 and P22 of the first position sensor 170. The other end of each of a plurality of lines L1 to L4 may be connected or bonded to a prescribed one of the elastic member contact portions 184-1 to 184-2 of the sensor board 180.

For example, the first line L1 of the circuit pattern can electrically connect the first input pin P11 and the fourth elastic member contact portion 184-4, the second line L2 of the circuit pattern can electrically connect the second input pin P12 and the third elastic member contact portion 184-3, the third line L3 of the circuit pattern can electrically connect the first output pin P21 and the first elastic member contact portion 184-1, and the fourth line L4 of the circuit pattern can electrically connect the second output pin P22 and the second elastic member contact portion 184-2.

According to one embodiment, the first to fourth lines L1 to L4 may be formed on a surface of the body 182 of the sensor board 180 so as to be visible to the naked eyes. According to another embodiment, the first to fourth lines L1 to L4 may be formed within the body 182 of the sensor board 180 so as to be invisible to the naked eyes.

The housing 140 is described as follows.

The housing 140 supports the second magnet 190 for sensing and the first magnet 130 for driving, and is able to receive the bobbin 110 inside so as to enable the bobbin 110 to move in the first direction parallel to the optical axis.

The housing 140 may have a hollow pillar shape overall. For example, the housing 140 may include a polygonal (e.g., tetragonal, octagonal) or circular hollow.

Figure 6:
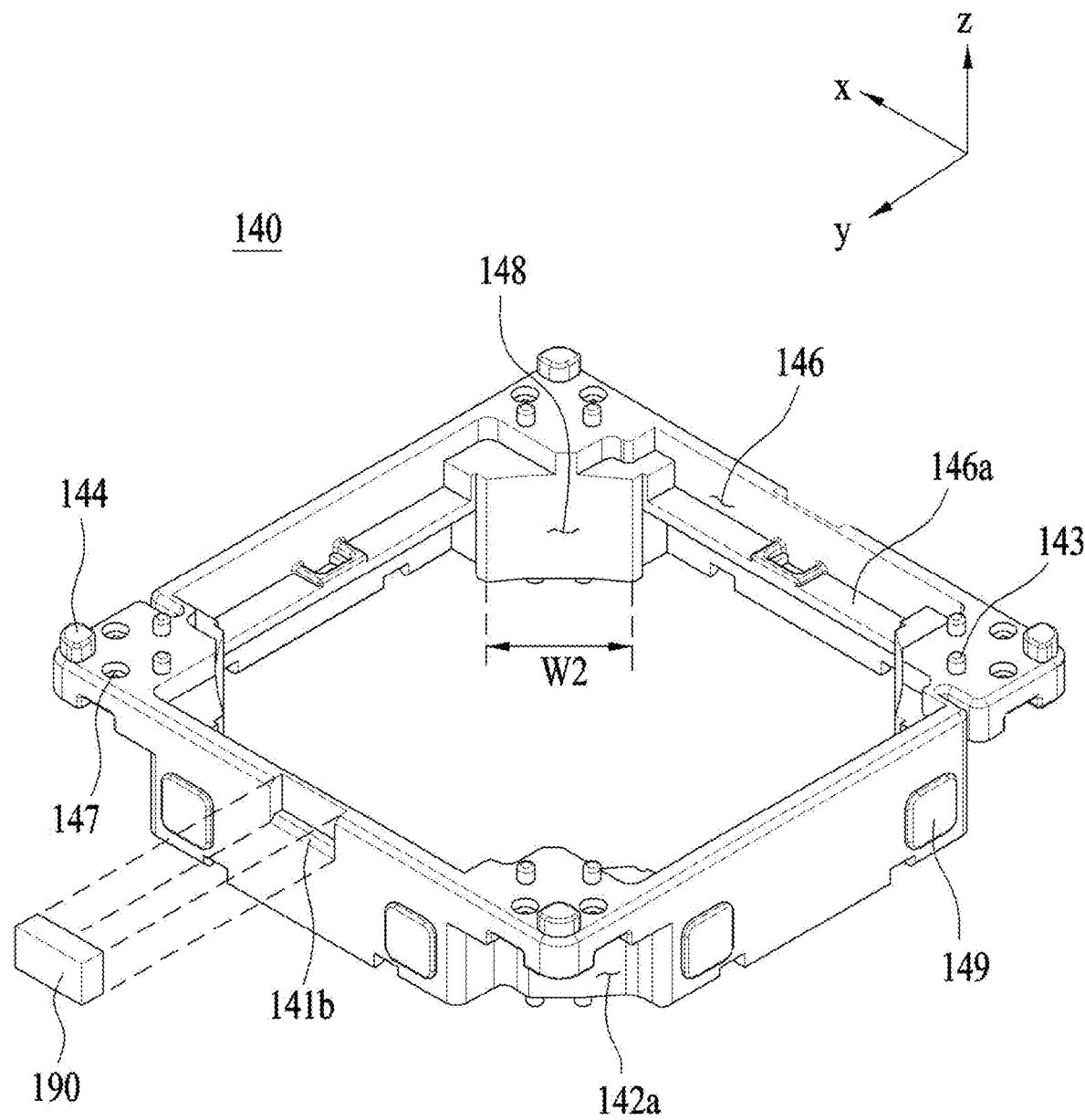
FIG. 6 is a front perspective diagram of a housing shown in FIG. 1.
Figure 7:
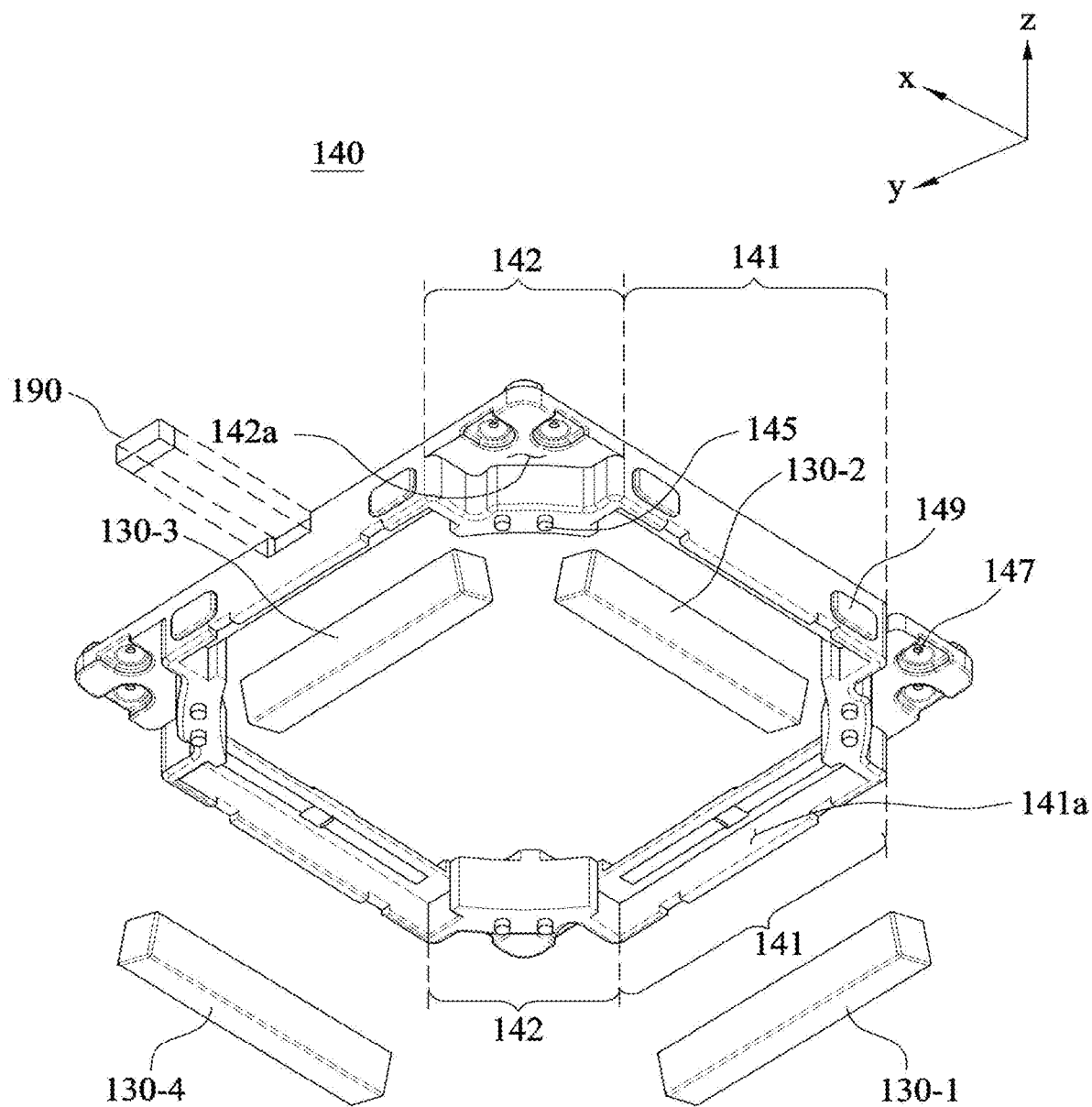
FIG. 7 is a rear exploded perspective diagram of a housing, second magnet and first magnet shown in FIG. 1.
Figure 8:
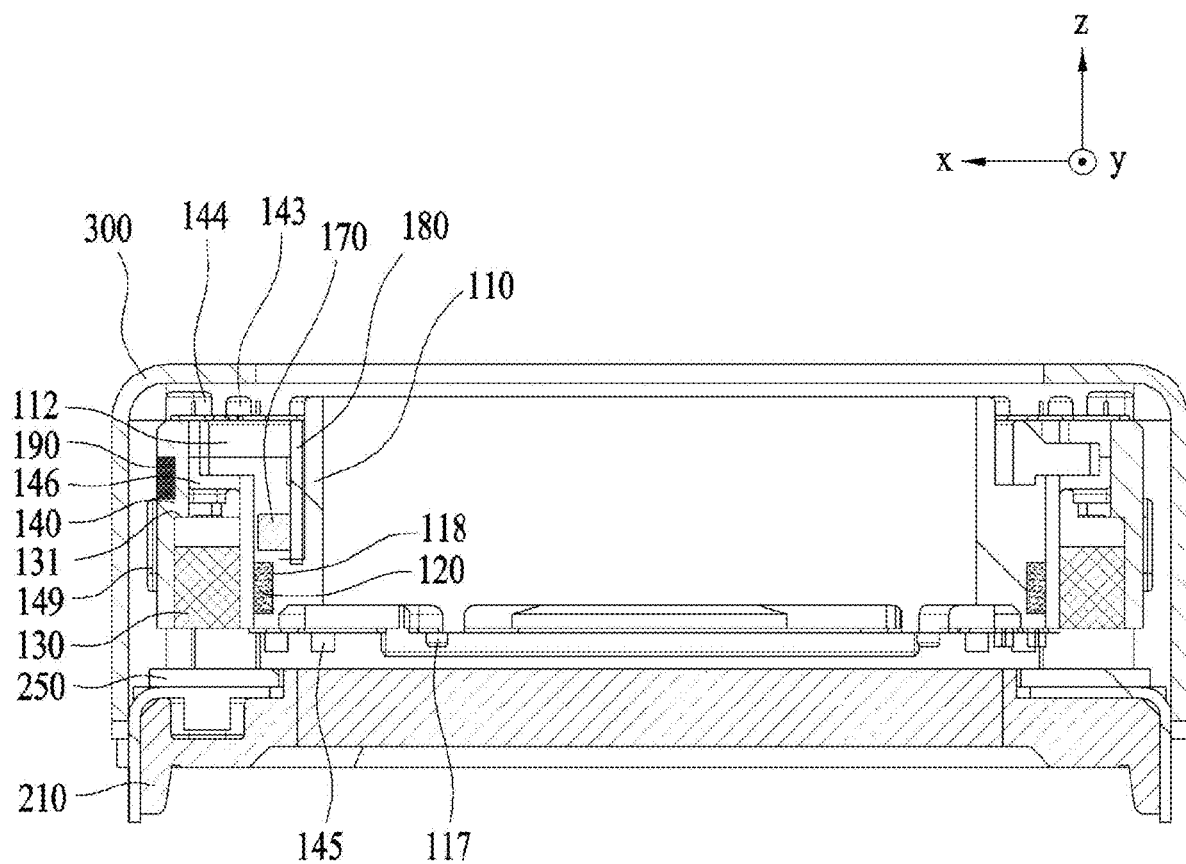
FIG. 8 is a cross-sectional diagram along a cutting line I-I' shown in FIG. 3.
Figure 9:
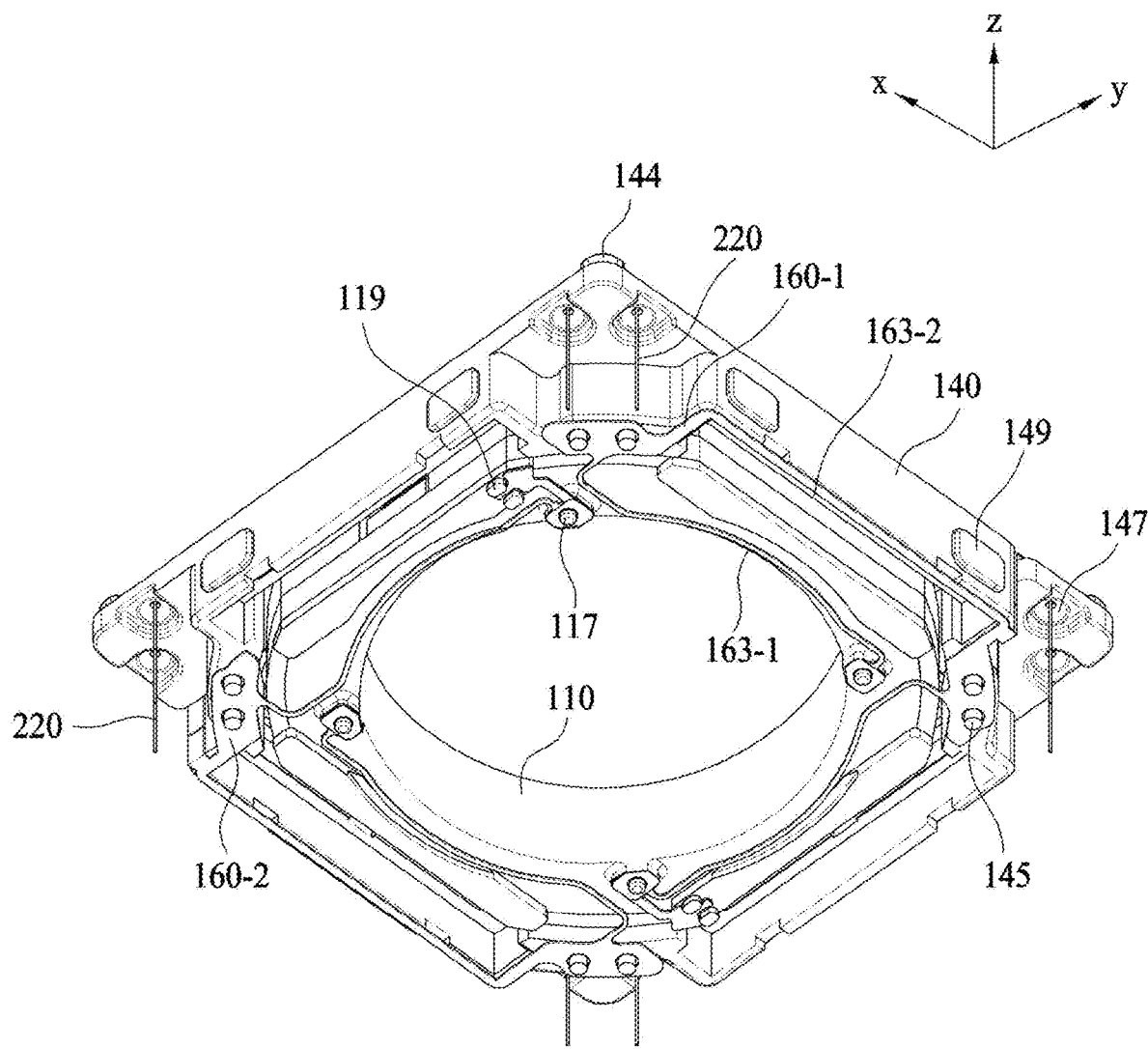
FIG. 9 is a rear assembled perspective diagram of a bobbin, housing, lower elastic member and plural support members shown in FIG. 1.

FIG. 6 is a front perspective diagram of the housing 140 shown in FIG. 1. FIG. 7 is a rear exploded perspective diagram of the housing 140, the second magnet 190 and the first magnet 130 shown in FIG. 1. FIG. 8 is a cross-sectional diagram along a cutting line I-I' shown in FIG. 3. FIG. 9 is a rear assembled perspective diagram of the bobbin 110, the housing 140, the lower elastic member 160 and the plural support members 220 shown in FIG. 1.

The housing 140 may have a first seat recess 146 formed at a location corresponding to the first and second protrusions 111 and 112 of the bobbin 110.

The housing 140 may have a third protrusion 148 corresponding to a space having a first width W1 between the first and second protrusions 111 and 112 of the bobbin 110.

A face of the third protrusion 148 of the housing 140 confronting the bobbin 110 may have the same shape of a lateral part of the bobbin 110. In this case, the first width W1 between the first and second protrusions 111 and 112 of the bobbin and a second width W2 of the third protrusion 148 of the housing 140 shown in FIG. 6 may have a predetermined tolerance. Thus, it is able to regulate the rotation of the third protrusion 148 of the housing 140 between the first and second protrusions 111 and 112 of the bobbin 110. If so, although the bobbin 110 receives a force not in the optical axis direction but in a direction of rotation centering on an optical axis, the third protrusion 148 of the housing 140 can inhibit the rotation of the bobbin 110.

For example, a upper side of an outer shell of the housing 140 has a shape of a quadrangular plane but a lower side of an inner shell of the housing 140, as shown in FIG. 6 and FIG. 7, may have a shape of an octagonal plane.

The housing 140 may include a plurality of lateral portions. For example, the housing 140 may include 4 first lateral portions 141 and 4 second lateral portions 142. Each of the second lateral portions 142 may be located between the 2 first lateral portions 141 adjacent to each other. Each of the first lateral portions 141 may be a portion corresponding to a side of the housing 140. Each of the second lateral portions 142 may be a portion corresponding to a corner of the housing 140.

A width or length of a side of each of the first lateral portions 141 may be greater than that of each of the second lateral portions 142.

For example, the first magnet 130 may be installed or disposed on the first lateral portions 142 of the housing 140. A support member 220 may be disposed on the second lateral portions 142 of the housing 140. The first lateral portions 141 of the housing 140 connect the second lateral portions 142 of the housing 140 mutually, and may include a plane to a predetermined depth.

Each of the first lateral portions 141 of the housing 140 may have an area equal to or greater than an area of the corresponding first magnet 130.

The housing 140 may include a first seat portion 141b for receiving the second magnet 190 and a second seat portion 141a for receiving the first magnets 130-1 to 130-4.

For example, the housing 140 may have the first seat portion 141b provided to an outer top end of one of the first lateral portions 141 and a second seat portion 141a provided to an inner bottom end of each of the first lateral portions 141.

The first seat portion 141b may be located over the second seat portion 141a.

The second magnet 190 may be inserted and fixed to the first seat portion 141b, and each of the second magnets 130-1 to 130-4 can be inserted and fixed to the second seat portion 141a provided to a prescribed one of the first lateral portions 141 of the housing 140.

The second seat portion 141a of the housing 140 may be formed as a concave recess corresponding to a size of the first magnet 130 and disposed in a manner of confronting at least 3 faces (i.e., upper side and both lateral sides) of the first magnet 130.

An opening may be formed on a lower side (i.e., a face confronting the second coil 230 mentioned later) of the second seat portion 141a of the housing 140. And, a lower side of the second magnet 130 fixed to the second seat portion 141a can directly confront the second coil 230.

The first and second magnets 130 and 190 can be fixed to the first and second seat portions 141b and 141a of the housing 140 by an adhesive agent, by which the embodiment is non-limited. Instead, an adhesive member such as a double-sided tape and the like may be usable.

Or, the first and second seat portions 141b and 141a of the housing 140 may be formed as mounting holes for exposing/fitting portions of the first and second magnets 130 and 190 therethrough/therein instead of the concave recesses shown in FIG. 6 and FIG. 7.

For example, the second magnet 190 may be located over one (e.g., 130-1) of the first magnets 130-1 to 130-4. The second magnet 190 may be disposed by being spaced apart from the first magnet (e.g., 130-1). A portion of the housing 140 may be disposed between the second magnet 190 and the first magnet (e.g., 130-1).

The first lateral portion 141 of the housing 140 may be disposed parallel to a lateral panel of the cover member 300. The first lateral portion 141 of the housing 140 may have a face greater than that of the second lateral portion 142. The second lateral portion 142 of the housing 140 can form a path for the support member 220 to pass through. A upper side of the second lateral portion 142 of the housing 140 may include a perforated hole 147. The support member 220 can be connected to the upper elastic member 150 by penetrating the perforated hole 147.

Moreover, in order to inhibit direct collision with an inner lateral side of the cover member 300 shown in FIG. 1, a second stopper 144 may be provided to a upper side of the housing 140.

The housing 140 may include at least one top support projection 143 provided to a upper side of the housing 140 for joining to the upper elastic member 150.

For example, the first top support projection 143 of the housing 140 may be formed on the upper side of the housing 140 corresponding to the second lateral portion 142 of the housing 140, by which the embodiment is non-limited. According to another embodiment, the first top support projection may be provided to a upper side of each of the first lateral portions of the housing 140.

The first top support projection 143 of the housing 140, as shown in the drawing, may have a hemispherical shape or a cylindrical or prismatic shape, by which the embodiment is non-limited.

A bottom support projection 145 joined and fixed to the lower elastic member 160 may be provided to a lower side of the housing 140.

In order to secure a space to be filled with gel type silicon capable of playing a damping role as well as to form a path for the support member 220 to pass through, the housing may include a first concave recess 142*a* formed on the second lateral portion 142. Namely, the concave recess 142*a* of the housing 140 can be filled with the damping silicon.

The housing 140 may include a plurality of third stoppers 149 projected from outer sides of the first lateral portions 141. The third stopper 149 is provided to inhibit the housing 140 from colliding with the cover member 300 when the housing 140 moves in the second and third directions.

In order to inhibit the lower side of the housing from colliding with the base 210 and/or the circuit board 250, the housing 140 may further include a fourth stopper (not shown) projected from a lower surface of the housing 140. Through such configuration, the housing 140 is spaced apart from the base 210 in a bottom direction and also spaced apart from the cover member 300 in a top direction, thereby enabling an optical direction height to be maintained without top/bottom interference. Therefore, the housing 140 can perform optical image stabilization by controlling movements in the second and third directions corresponding to a back-forth direction and a right-left direction in the place vertical to the optical axis.

The second magnet 190 and the first magnet 130 (130-1 to 130-4) are described as follows.

The first magnet 130 can be disposed on the second seat portion 141*a* of the housing 140 so as to overlap with the first coil 120 in a direction vertical to the optical axis.

According to another embodiment, the first and second magnets 130 and 190 are disposed on an outer or inner side of the first lateral portion 141 or may be disposed on an inner or outer side of the second lateral portion 142 of the housing 140.

According to further embodiment, the second magnet 190 may be received inside or outside the first lateral portion 141 of the housing 140.

A shape of the first magnet 130 may include an approximately rectangular shape corresponding to the first lateral portion 141 of the housing 140, and a face confronting the first coil 120 may be formed to correspond to a curvature of a corresponding face of the first coil 120.

The first magnet 130 may be configured as a uni-body. In case of the embodiment, referring to FIG. 5A, a face confronting the first coil 120 is disposed to become the S pole 132 and an outer face is disposed to become the N pole 134, and vice versa. By this, the embodiment is non-limited.

At least two first magnets 130 can be disposed in the housing 140. The embodiment may include 4 first magnets 130-1 to 130-4 disposed on the first lateral portions 141 of the housing 140, and each of the 4 first magnets 130-1 to 130-4 may be disposed on a corresponding one of the 4 first lateral portions of the housing 140. In this case, a plane of each of the first magnets 130-1 to 130-4, as shown in FIG. 5A, may have an approximately quadrangular shape or one of a triangular shape and a rhombus shape.

In the lens drive unit according to the embodiment, the first coil 120 and the first position sensor 170 are disposed on the bobbin 110 and the first and second magnets 130 and 190 are disposed on the housing, by which the embodiment is non-limited. According to another embodiment, the first coil 120 may be disposed on the housing 140 and the first magnet 130 may be disposed on the bobbin 110. Moreover, the first position sensor 170 may be disposed on the housing 140 and the second magnet 190 may be disposed on the bobbin 110.

The upper elastic member 150, the lower elastic member 160 and the support member 220 are described as follows.

The top and lower elastic members 150 and 160 elastically support the bobbin 110. The support member 220 can support the housing 140 to be movable in a direction vertical to the optical axis with respect to the base 210 and connect at least one of the top and lower elastic members 150 and 160 to the circuit board 250 electrically.

Figure 10:
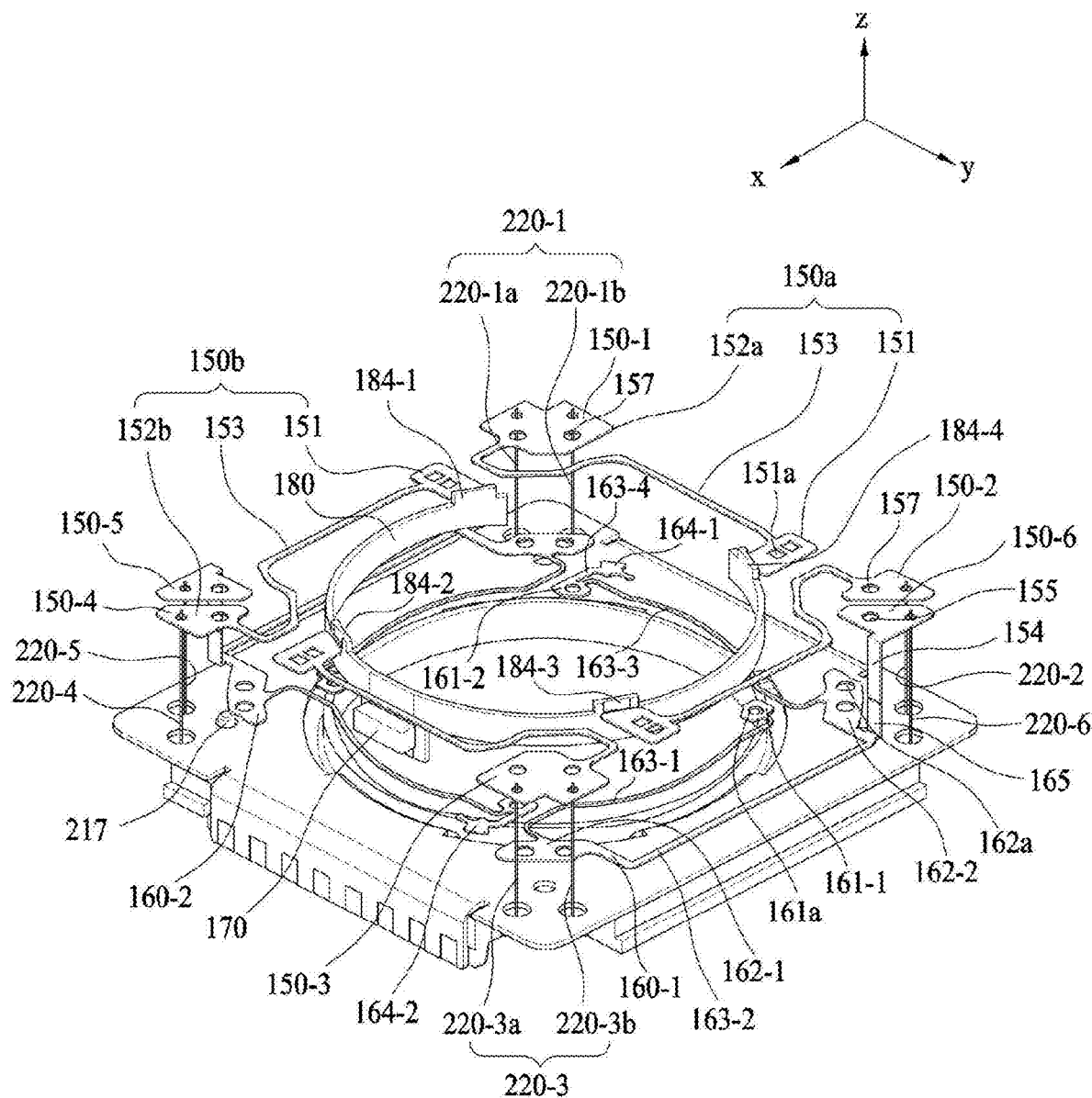
FIG. 10 is an assembled perspective diagram of an upper elastic member, lower elastic member, first position sensor, sensor board, base, support member and circuit board shown in FIG. 1.

FIG. 10 is an assembled perspective diagram of the upper elastic member 150, the lower elastic member 160, the first position sensor 170, the sensor board 180, the base 210, the support member 220 and the circuit board 250 shown in FIG. 1.

The upper elastic member 150 may include a plurality of upper elastic members 150 (150-1 to 150-4) spaced apart from each other by being electrically separated from each other. The term 'upper elastic member' may be referred to as 'top spring'.

The elastic member contact portions 184-1 to 184-4 of the sensor board 180 may be electrically connected to at least one of the top and lower elastic members 150 and 160.

For example, FIG. 10 shows that the elastic member contact portions 184-1 to 184-4 electrically come into contact with the upper elastic members 150-1 to 150-4, by which the embodiment is non-limited. According to another embodiment, the elastic member contact portions 184-1 to 184-4 may electrically come in contact with the lower elastic member 160 or both of the top and lower elastic members 150 and 160.

Each of the elastic member contact portions 184-1 to 184-4 of the sensor board 180, which are electrically connected to the first position sensor 170, can be electrically connected to a corresponding one of a plurality of the upper elastic members 150-1 to 150-4. Each of a plurality of the upper elastic members 150-1 to 150-4 may be electrically connected to a corresponding one of a plurality of the support members 220-1 to 220-4.

Each of the first to fourth upper elastic members 150-1 to 150-4 may include a first inner frame joined to the bobbin 110, a first outer frame joined to the housing 140, and a first frame connecting portion connecting the inner and outer frames together.

For example, each 150a of the first and third upper elastic members 150-1 and 150-3 may include the first inner frame 151, the first outer frame-1 152a, and the first frame connecting portion 153.

For example, each 150b of the second and fourth upper elastic members 150-2 and 150-4 may include the first inner frame 151, the first outer frame-2 152b, and the first frame connecting portion 153.

The first inner frame 151 of each of the first to fourth upper elastic members 150-1 to 150-4 may be joined to the bobbin 110, and the inner frame 151 of each of the first to fourth upper elastic members 150-1 to 150-4 may be joined to a corresponding one of the elastic member contact portions 184-1 to 184-4 of the sensor board 180 and connected thereto electrically.

If the upper surface 112a of the second protrusion 112 of the bobbin 110 is flat, as shown in FIG. 4, the first inner frame 151 of the upper elastic member 150 is placed on the upper surface 112a of the second protrusion 112 of the bobbin 110 and then fixed to the upper surface 12a of the second protrusion 112 by an adhesive member.

The first outer frame-1 152a and the first outer frame-2 152b may be joined to the housing 140 and connected to the support member 220. The first frame connecting portion 153 can connect the first inner fame 151 to the first outer frame-1 152a and the first outer frame-2 152b.

The first outer frame-1 152a and the first outer frame-2 152b may differ from each other in shape. For example, the first outer frame-2 152b may have a shape of one of 2 equal parts resulting from dividing the first outer frame-1 152a into the 2 equal parts, by which the embodiment is non-limited. According to another embodiment, the first outer frame-1 152a and the first outer frame-2 152b may have the same shape.

According to further embodiment, the first outer frame-1 152a may be divided into 2 equal parts, and a shape of one of the 2 equal parts may have the same shape of the first outer frame-2 152b.

The first frame connecting portion 153 can form a pattern in a predetermined shape by being bent once at least. Through a position change and fine deformation of the first frame connecting portion 153, an ascending and/or descending operation of the bobbin 110 can be elastically supported in the first direction parallel to the optical axis.

The first top support projection 143 of the housing 140 can be joined and fixed to the first outer frame-1 152a and the first outer frame-2 152b of the upper elastic member 150 shown in FIG. 10. According to an embodiment, a second perforated hole-2 157 in a shape corresponding to a position corresponding to the first top support projection 143 may be provided to each of the first outer frame-1 152a and the first outer frame-2 152b. In this case, the first top support projection 143 and the second perforated hole-2 157 may be fixed to each other by thermosetting or adhesive member such as epoxy, etc.

Through current carrying connections between the elastic member contact portions 184-1 to 184-4 and the first to fourth upper elastic members 150-1 to 150-4, the 4 pins P11 to P22 of the first position sensor 170 can be electrically connected to the first to fourth upper elastic members 150-1 to 150-4.

The first to fourth upper elastic members 150-1 to 150-4 are connected to the circuit board 250 through the support members 220-1 to 220-4.

The first upper elastic member 150-1 can be electrically connected to the circuit board 250 through the first support member 220-1. The first support member 220-1 may include a first support member-1 220-1a and a first support member-2 220-1b. At least one of the first support member-1 220-1a and the first support member-2 220-1b can be electrically connected to the circuit board 250.

The second upper elastic member 150-2 can be electrically connected to the circuit board 250 through the second support member 220-2.

The third upper elastic member 150-3 can be electrically connected to the circuit board 250 through the third support member 220-3. The third support member 220-3 may include a third support member-1 220-3a and a third support member-2 220-3b. At least one of the third support member-1 220-3a and the third support member-2 220-3b can be electrically connected to the circuit board 250.

The fourth upper elastic member 150-4 can be electrically connected to the circuit board 250 through the fourth support member 220-4.

Through two prescribed upper elastic members selected from the first to fourth upper elastic members 150-1 to 150-4 and two prescribed support members selected from the first to fourth support members 220-1 to 220-4 connected the selected two prescribed upper elastic members, the first position sensor 170 can receive an input signal from the circuit board 250.

Through two remaining upper elastic members selected from the first to fourth upper elastic members 150-1 to 150-4 and two remaining support members selected from the first to fourth support members 220-1 to 220-4 connected the selected two remaining upper elastic members, the first position sensor 170 can output an output signal of the first position sensor 170 to the circuit board 250.

Meanwhile, the lower elastic member 160 can include first and second lower elastic members 160-1 and 160-2 spaced apart from each other by being electrically separated from each other. The first coil 120 may be electrically connected to the first and second lower elastic members 160-1 and 160-2, and the first and second lower elastic members 160-1 and 160-2 can be connected to fifth and sixth support members 220-5 and 220-6.

Each of the first and second lower elastic members 160-1 and 160-2 may include at least one second inner frame, at least one second outer frame and at least one second frame connecting portion.

For example, each of the first and second lower elastic members 160-1 and 160-2 may include 2 second inner frames 161-1 and 161-2, 2 second outer frames 162-1 and 162-2, and 3 second frame connecting portions 163-1 to 163-3.

The second inner frames 161-1 and 161-2 can be joined to the bobbin 110, and the second outer frames 162-1 and 162-2 can be joined to the housing 140.

For example, the second frame connecting portion-1 163-1 connects the second inner frame 161-1 and the second outer frame 162-1, the second frame connecting portion-2 163-2 connects the 2 second outer frames 162-1 and 162-2, and the second frame connecting portion-3 connects the second inner frame 161-2 and the second outer frame 162-2.

The first lower elastic member 160-1 may further include a first coil frame 164-1, and the second lower elastic member 160-2 may further include a second coil frame 164-2.

Referring to FIG. 10, each of the first and second coil frames 164-1 and 164-2 can be connected to one of both ends of the first coil 120 through a current carrying connecting member such as a solder and the like. The first and second lower elastic members 160-1 and 160-2 receive a drive signal such as first and second powers of different polarities from the circuit board 250 and then deliver them to the first coil 120.

Each of the first and second lower elastic members 160-1 and 160-2 may further include a second frame connecting portion-4 163-4. The second frame connecting portion-4 163-4 can connect the coil frame 164-1 or 164-2 to the second inner frame 161-2.

At least one of the second frame connecting portion-1 163-1, the second frame connecting portion-2 163-2, the second frame connecting portion-3 163-3, and the second frame connecting portion-4 163-4 can form a pattern in a predetermined shape by being bent at least once. Particularly, through the position changes and fine deformations of the second frame connecting portion-1 163-1 and the second frame connecting portion-3 163-3, an ascending and/or descending operation of the bobbin 110 in the first direction parallel to the optical axis can be elastically supported.

According to one embodiment, as shown in the drawing, each of the first and second lower elastic members 160-1 and 160-2 may further include a bent portion 165. For example, the bent portion 165 may be connected to the second outer frame 162. For example, the bent portion 165 may be bent from the second fame connecting portion-2 163-2 toward the upper elastic member 150 in the first direction. For example, the bent portion 165 may be connected to a portion at which the second outer frame 162-2 and the second frame connecting portion-2 163-2 meet each other.

The upper elastic member 160 may further include fifth and sixth upper elastic members 150-5 and 150-6. The first to sixth upper elastic members 150-1 to 150-6 can be separated from each other electrically and spaced apart from each other. The fifth and sixth upper elastic members 150-5 and 150-6 can be electrically connected to the circuit board through the fifth and sixth support members 220-5 and 220-6.

Each of the fifth and sixth upper elastic members 150-5 and 150-6 may include a connecting frame 154 joined to the housing 140 and a first outer frame-3 155 having one end connected to the connecting frame 154 and the other end connected to the bent portion 165 of a corresponding one of the first and second lower elastic members 160-1 and 160-2.

The connecting frame 154 of each of the fifth and sixth elastic members 150-5 and 150-6 may be connected to the bent portion 165 of a corresponding one of the first and second lower elastic members 160-1 and 160-2 and extend in the first direction.

Each of the fifth and sixth elastic members 150-5 and 150-6 may be connected to the housing 155 by being bent from the connecting frame 154 in a direction vertical to the first direction, and connected to a corresponding one of the fifth and sixth support members 220-5 and 220-6.

The first outer frame-3 155 of the fifth upper elastic member 150-5 may be connected to the fifth support member 220-5, and the first outer frame-3 155 of the sixth upper elastic member 150-6 may be connected to the sixth support member 220-6.

For example, the bent portion 165 of each of the first and second lower elastic members 160-1 and 160-2, the connecting frame 154 of a corresponding prescribed one of the fifth and sixth elastic members 150-5 and 150-6, and the first outer frame 155-3 can be integrally formed. Thus, each of the first and second lower elastic members 160-1 and 160-2 and each of the fifth and sixth elastic members 150-5 and 150-6 can have the portions 165 and 154 bent in the first direction, respectively.

Meanwhile, through the fifth and sixth support members 220-5 and 220-6 and the fifth and sixth elastic members 150-5 and 150-6 connected thereto, the first and second lower elastic members 160-1 and 160-2 can receive a drive signal from the circuit board 250 and then provide the drive signal to the first coil 120.

In the present embodiment, each of the top and lower elastic members 150 and 160 is partitioned. Yet, according to another embodiment, at least one of the top and lower elastic members 150 and 160 may not be partitioned.

The first bottom support projection 117 of the bobbin 117 can join and fix the second inner frame 161-1 and 161-2 of the lower elastic member 160 and the bobbin 110 to each other. The second bottom support projection 145 of the housing 140 can join and fix the second outer frame 162-1 and 162-2 of the lower elastic member 160 and the housing 140 to each other.

A perforated hole 161a may be provided to the second inner frame 161-1 and 161-2 of each of the first and second lower elastic members 160-1 and 160-2. The perforated hole 161a may be disposed at a location corresponding to the first bottom support projection 117 of the bobbin 110 and have a shape corresponding to the first bottom support projection 117 of the bobbin 110. For example, the first bottom support projection 117 of the bobbin 110 and the perforated hole 161a can be fixed to each other by thermosetting or adhesive member such as epoxy, etc.

A perforated hole 162a may be provided to the second outer frame 162-1 and 162-2 of each of the first and second lower elastic members 160-1 and 160-2. The perforated hole 162a may be disposed at a location corresponding to the second bottom support projection 145 of the housing 140 and have a shape corresponding to the second bottom support projection 145 of the housing 140. For example, the second bottom support projection 145 of the housing 140 and the perforated hole 162a can be fixed to each other by thermosetting or adhesive member such as epoxy, etc.

Each of the upper elastic member 150 and the lower elastic member 160 may be prepared as a leaf spring, but the embodiment is non-limited by the material of the upper elastic member 150 and the lower elastic member 160.

Power is supplied to the first position sensor 170 using the electrically-separated 2 upper elastic members and 2 support members. And, an output signal outputted from the first position sensor 170 can be delivered to the circuit board 250 using the electrically-separated 2 remaining upper elastic members and 2 remaining support members.

Power can be supplied to the first coil 120 using the electrically-separated 2 lower elastic members 160-1 and 160-2, the remaining 2 upper elastic members 150-5 and 150-6, and the remaining 2 support members 220-5 and 220-6, by which the embodiment is non-limited.

Namely, according to another embodiment, the role of a plurality of upper elastic members and the role of a plurality of lower elastic members may be switched to each other. For example, power can be supplied to the first coil 120 using 2 prescribed upper elastic members and 2 prescribed support members, power can be supplied to the first position sensor 170 using 2 prescribed lower elastic members, and an output signal outputted from the first position sensor 170 can be delivered to the circuit board 250 using 2 remaining prescribed lower elastic members. This is not shown in the drawing but is obvious through the above drawings.

The support member 220 (220-1 to 220-6) is described as follows.

A plurality of the support members 220 may be disposed on the second lateral portions 142 of the housing 140, respectively. For example, 2 support members 220 can be disposed to correspond to each of 4 second lateral portions 142. The embodiment may include total 8 support members 220-1a, 220-1b, 220-2, 220-3a, 220-3b, 220-4, 220-5 and 220-6, by which the embodiment is non-limited.

According to another embodiment, in the housing 140, a single support member may be disposed on each of two second lateral portions among 4 second lateral portions 142 and 2 support members may be disposed on each of the 2 remaining second lateral portions 142.

According to another embodiment, the support member 220 may be disposed as a leaf spring on the first lateral portion 141 of the housing 140.

As described above, the support member 220 may form an electrical path between the upper elastic member 150 and the circuit board 250. For example, the support member 220 can form a path for delivering a drive signal and power required by the first position sensor 170 and the first coil 120 and a path for providing an output signal outputted from the first position sensor 170 to the circuit board 250.

The support member 220 may be embodied by such a member supportive by elasticity as a leaf spring, a coil spring, a suspension wire, etc. Moreover, according to another embodiment, the support member 220 may be integrally formed with the upper elastic member.

The base 210, the circuit board 250 and the second coil 230 are described as follows.

The base 210 may have a hollow corresponding to a hollow of the bobbin 110 or/and a hollow of the housing 140 and be in a shape matching or corresponding to the cover member 300, e.g., a quadrangular shape.

Figure 11:
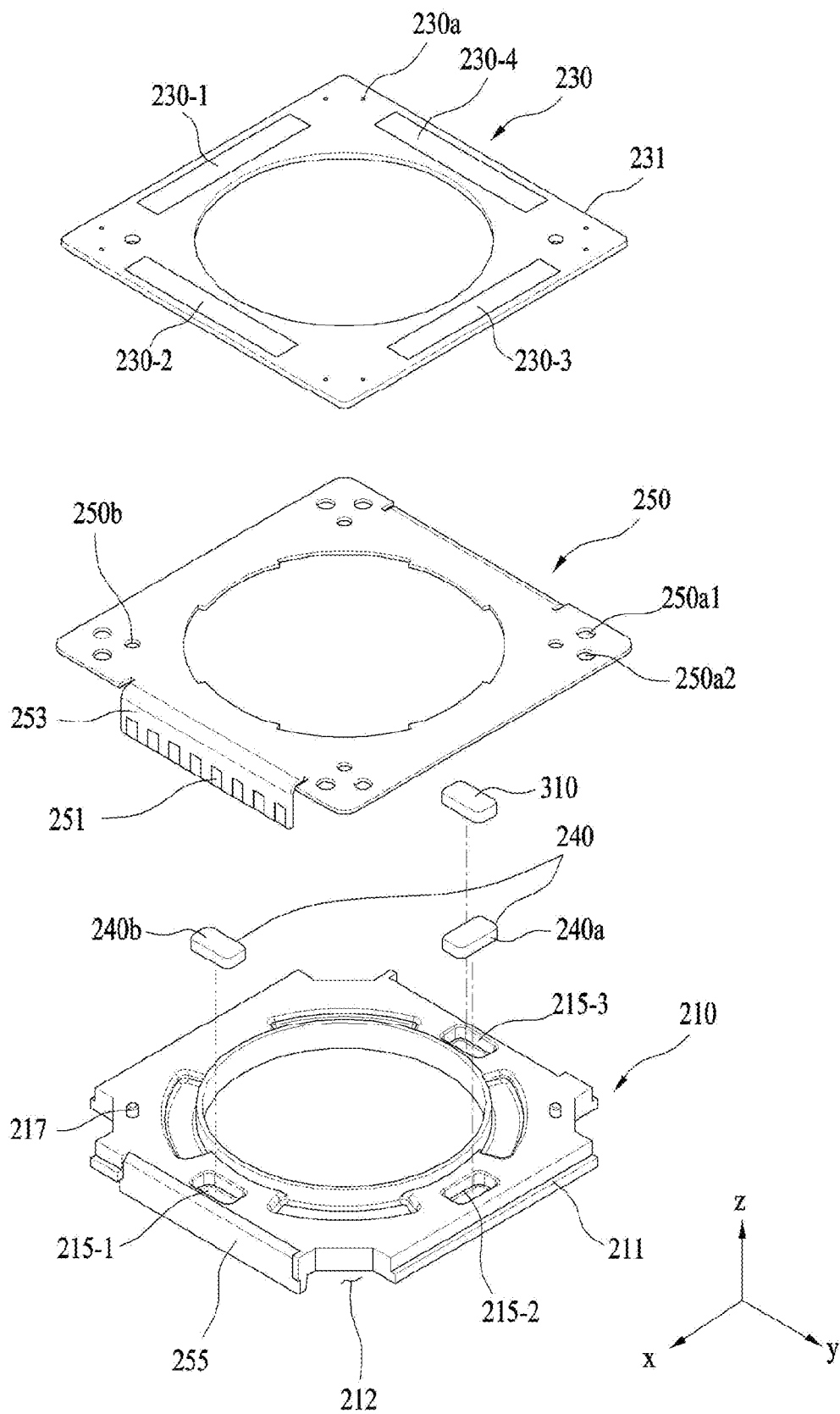
FIG. 11 is an exploded diagram of a base, second coil, circuit board and capacitor shown in FIG. 1.

FIG. 11 is an exploded diagram of the base 210, the second coil 230, the circuit board 250 and the capacitor 310 shown in FIG. 1.

The base 210 may include a step sill 211 on which an adhesive agent can be coated when the cover member 300 is adhesively fixed. Here, the step sill 211 can guide the cover member 300 joined to an upper side and an end portion of the cover member 300 can be joined to the step sill 211 by surface contact.

The step sill 211 of the base 210 and the end portion of the cover member 300 may be bonded or fixed to each other by an adhesive agent or the like.

On a face of the base 210 confronting a portion where a terminal 251 of the circuit board 250 is formed, a rack 255 in a corresponding size may be formed. The rack 255 of the base 210 is formed as a uniform cross section from an outer side of the base 210 without the step sill 211, thereby supporting a terminal side 253 of the circuit board 250.

A corner of the base 210 may have a second concave recess 212. If the corner of the cover member 300 has a projected shape, a projected portion of the cover member 300 can be joined to the base 210 in the second concave recess 212.

A seat recess 215-1/215-2 may be provided to an upper side of the base 210 so that the second position sensor 240 can be disposed therein. According to an embodiment, 2 seat recesses 215-1 and 215-2 can be provided to the base 210. As the second position sensor 240 is disposed in the seat recesses 215-1 and 215-2 of the base 210, it is able to sense an extent for the housing 140 to move in the second direction and the third direction, e.g., a displacement of the housing 140 in the second direction and the third direction. For example, in order to sense a displacement of the housing 140 in the second direction and the third direction, an angle formed by virtual lines connecting centers of the seat recesses 215-1 and 215-2 of the base 210 to the center of the base 210 may include 90 degrees, by which the embodiment is non-limited.

Moreover, a recess 215-3, in which the capacitor 310 is disposed, can be provided to an upper side of the base 210. For example, in order to facilitate connection to terminals, the recess 215-3 may be formed on a prescribed region of the upper side of the base 210 adjacent to the terminal side 253 of the circuit board 250.

Each of the seat recesses 215-1 and 215-2 of the base 210 may be disposed so as to be aligned at or near the center of the second coil 230. Or, the center of the second coil 230 may be matched or aligned with the center of the second position sensor 240.

With reference to the circuit board 250, the second coil 230 may be disposed at the upper side and the second position sensor 240 and the capacitor 310 may be disposed at the lower side, by which the embodiment is non-limited. According to another embodiment, at least one of the second position sensor 240 and the capacitor 310 may be disposed on the circuit board 250. Moreover, the capacitor 310 may be formed within the circuit board 250.

The second position sensor 240 can sense a displacement of the housing 140 with respect to the base 210 in a direction (e.g., X-axis or Y-axis) vertical to the optical axis (e.g., Z-axis).

In order to sense a displacement of the housing 140 in a direction vertical to the optical axis, the second position sensor 240 may include 2 sensors 240a and 240b disposed orthogonal to each other. The first position sensor 170 may be referred to as 'AF (auto focus) position sensor', while the second position sensor 240 may be referred to as 'OIS (optical image stabilizer) position sensor'.

The circuit board 250 may be disposed on the upper side of the base 210 and have a hollow corresponding to the hollow of the bobbin 110, the hollow of the housing 140, or/and the hollow of the base 210. A shape of the circuit board 250 may include a shape (e.g., a quadrangular shape) matching or corresponding to the upper side of the base 210.

The circuit board 250 may include at least one terminal side 253 on which a plurality of terminals 251 or pins for being supplied with electrical signals externally.

The terminals 251 of the circuit board 250 can be electrically connected to the second coil 230, the second location sensors 240a and 240b, the support member 220 and the capacitor 310.

In FIG. 11, the second coil 230 is embodied as prepared to a circuit member 231 separate from the circuit board 250, by which the embodiment is non-limited. According to another embodiment, the second coil may be embodied by a coil block of a ring type, an FP (fine pattern) coil, or a circuit pattern formed on the circuit board 250.

The second coil 230 may include a through-hole 230a through the circuit member 231. The support member 220 can be electrically connected to the circuit board 250 by passing through the through-hole 2130a.

The second coil 230 is disposed on the upper side of the circuit board 250 so as to confront the first magnet 130 fixed to the housing 140, and connected to the circuit board 250 electrically.

Total 4 second coils 230 can be installed on 4 sides of the circuit board 250, by which the embodiment is non-limited. One second coil for the second direction and one second coil for the third direction can be installed. Or, 4 or more second coils may be installed.

For example, each of the 4 second coils 230-1 to 230-4 can be electrically connected to 2 corresponding terminals among the terminals of the circuit board 250.

As described above, the housing 140 is moved in the second direction and/or the third direction by interaction between the first magnet 130 and the second coil 230 disposed to confront each other, whereby optical image stabilization can be performed.

The second position sensor 240 may be provided as a hall sensor and employ any sensors capable of sensing magnetic field strength. For example, the second position sensor 240 may be embodied by a driver including a hall sensor, or embodied independently by a position detecting sensor such as a hall sensor, etc.

A plurality of the terminals 251 may be installed on the terminal side 253 of the circuit board 250. For example, through a plurality of the terminals 251 installed on the terminal side 253 of the circuit board 250, external power is received to supply power to the first and second coils 120 and 130 and the first and second position sensors 170 and 240 and output signals outputted from the first and second position sensors 170 and 240 can be outputted externally.

According to an embodiment, the circuit board 250 may be prepared as FPCB, by which the embodiment is non-limited. It is possible to directly form the terminals of the circuit board 250 on a surface of the base 210 using a surface electrode scheme or the like.

The circuit board 250 may include through-holes 250a1 and 250a2 through which the support member 220 can pass. The support member 220 can be electrically connected to the corresponding circuit pattern disposed on a lower side of the circuit board 250 through the through-holes 250a1 and 250a2 of the circuit board 250 by soldering and the like. According to another embodiment, the circuit board 250 may not include the through-holes 250a1 and 250a2. The support member 220 may be electrically connected to the circuit pattern or pad formed on the upper side of the circuit board 250.

The circuit board 250 may further include a through-hole 250b joined to the top support projection 217 of the base 210. The top support projection 217 of the base 210 and the through-hole 250b, as shown in FIG. 11, may be fixed to each other by thermosetting or adhesive member such as epoxy, etc.

Figure 12:
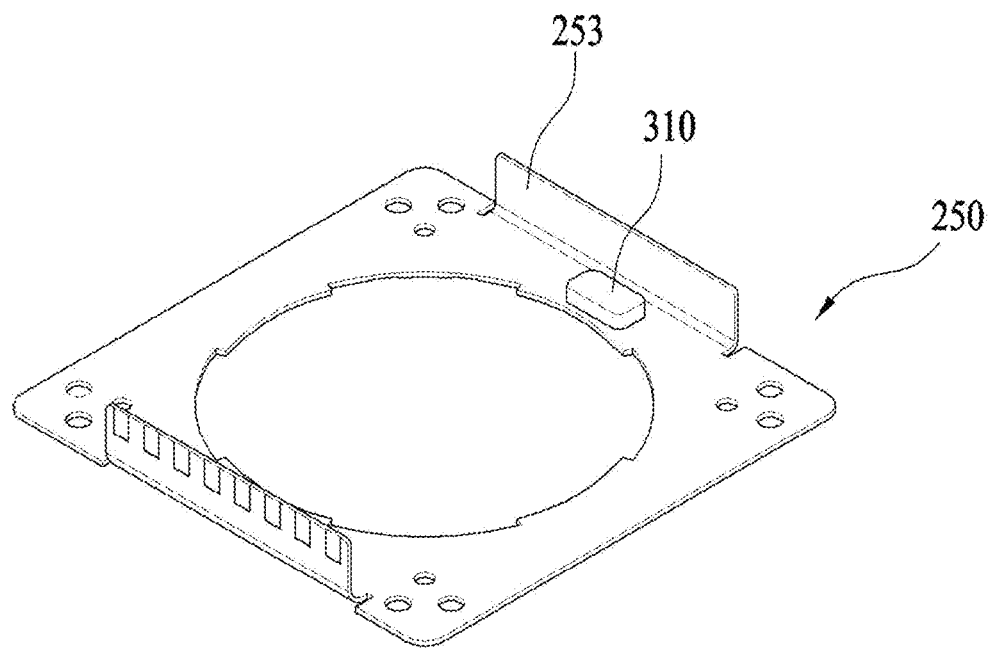
FIG. 12 shows a capacitor mounted on a circuit board.

FIG. 12 shows the capacitor 310 mounted on the circuit board 250.

Referring to FIG. 12, the capacitor 310 may be disposed on a first face of the circuit board 250. For example, the first face of the circuit board 250 may include a lower side of the circuit board 250 confronting an upper side of the base 210. For example, the capacitor 310 may be bonded to the lower side of the circuit board 250 and connected electrically thereto.

According to another embodiment, the capacitor 310 may be disposed on the upper side of the circuit board 250.

The capacitor 310 can be disposed or mounted as a chip or condenser on the circuit board 250, by which the embodiment is non-limited.

According to another embodiment, the first capacitor 310 may be embodied as included in the circuit board 250. For example, the circuit board 250 may include a capacitor consisting of a first conductive layer, a second conductive layer, and a first insulating layer (e.g., dielectric) disposed between the first and second conductive layers.

Figure 13:
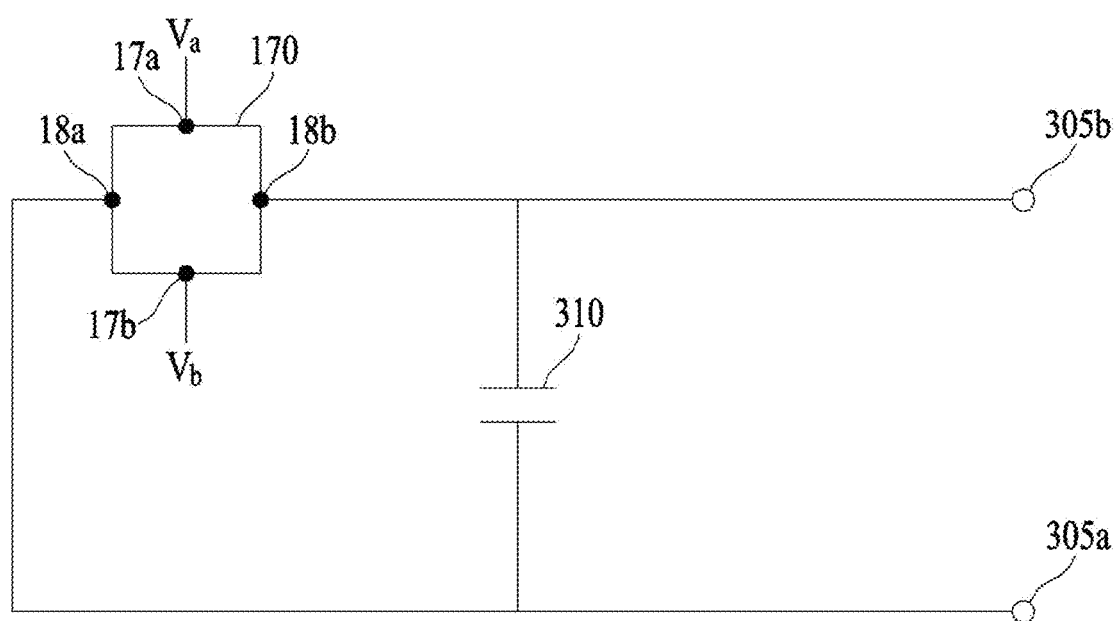
FIG. 13 is a circuit diagram showing electrical connection between a capacitor and a first position sensor.

The capacitor may be connected in parallel to output ends of the first position sensor 170. FIG. 13 is a circuit diagram showing electrical connection between the capacitor 310 and the first position sensor 170.

Referring to FIG. 13, the first position sensor 170 may include a first input terminal 17a provided with a first input signal Va, a second input terminal 17b provided with a second input signal Vb, a first output terminal 18a, and a second output terminal 18b.

The capacitor 310 can be connected in parallel to the first and second output terminals 18a and 18b of the first position sensor 170. Namely, one end 305a of the capacitor 310 can be connected to or access the first output terminal 19a and the other end 305b of the capacitor 310 can be connected to or access the second output terminal 18b.

The first position sensor 170 may include a resistor (not shown) inside, and the capacitor 310 can for a primary low band pass filter with the resistor in the first position sensor 170, e.g., an RC filter.

A resistance of the internal resistor of the first position sensor 170 may range 500 ohm (Ω)~1000 ohm (Ω), a capacitance of the capacitor 310 may range 1 nF~100 nF, and a cutoff frequency of the primary low band pass filter consisting of the internal resistor of the first position sensor 170 and the capacitor 310 may range 1.6 [KHz]~318.3 [KHz].

Moreover, for example, in order to eliminate PWM noise due to crosstalk between the first coil 120 and the first position sensor 170 from the output of the first position sensor 170, the capacitance of the capacitor 310 may range 10 nF 50 nF and the cutoff frequency may range 3.19 [KHz]~31.9 [KHz].

For example, a resistance of the internal resistor of the first position sensor 170 may be 750 ohm (Ω), a capacitance of the capacitor 310 may be 15 F, and a cutoff frequency of the primary low band pass filter consisting of the internal resistor of the first position sensor 170 and the capacitor 310 may be about 14 KHz. When a frequency of a PWN signal that is a drive signal provided to the first coil 120 is 500 KHz (or 1 MHz), a gain of the primary low band pass filter may be −31 [dB] (or, −37 [dB].

Figure 14:
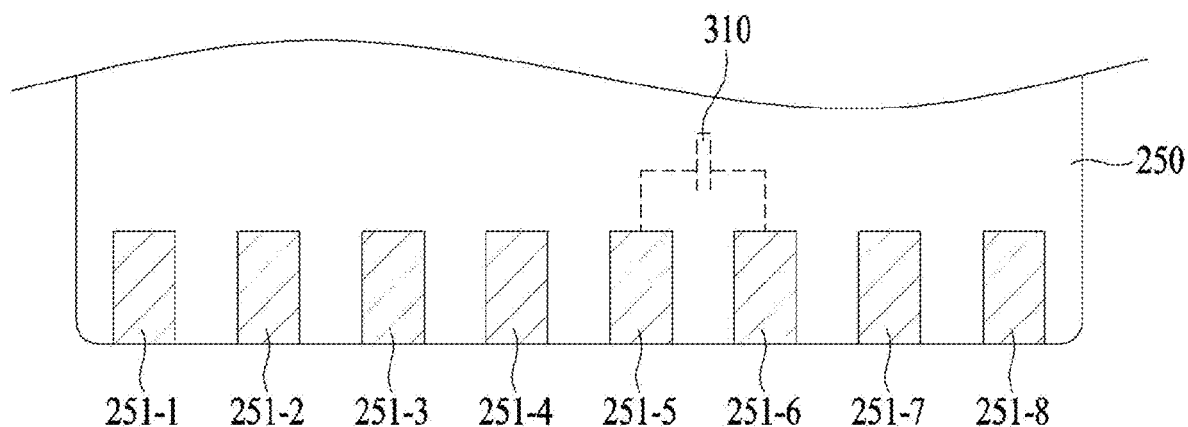
FIG. 14 shows electrical connection relations between a capacitor and terminals of a circuit board.

FIG. 14 shows electrical connection relations between the capacitor 310 and terminals of the circuit board 250.

Referring to FIG. 14, by the electrical connection between the elastic member contact portions 184-1 to 184-4 and the upper elastic member 150, the first and second output terminals 18a and 18b of the first position sensor 170 can be electrically connected to 2 upper elastic members selected from the first to fourth upper elastic members 150-1 to 150-4.

Through the electrical connection between the selected 2 upper elastic members and the corresponding support members and the electrical connection between the support members and the circuit board 250, the first and second output terminals 18a and 18b of the first position sensor 170 can be electrically connected to 2 terminals (e.g., 251-5 and 251-6) among the terminals (e.g., 251-1 to 251-8) of the circuit board 250. In FIG. 14, some of the terminals of the circuit board 250 are shown, by which the number of the terminals is non-limited.

The capacitor 310 can be connected in parallel to the 2 terminals (e.g., 251-5 and 251-6) of the circuit board 250 electrically connected to the first and second output terminals 18a and 18b of the first position sensor 170.

According to the embodiment, as a low pass filter including the capacitor 310 connected in parallel to the first and second output terminals 18a and 18b of the first position sensor 170 is configured, PWM noise due to crosstalk between the first coil 120 and the first position sensor 170 can be eliminated from the output signal of the first position sensor 170, and feedback closed-loop AF performance of the first position sensor 170 can be improved by reducing a gain in a frequency region over 1 KHz in audible frequency.

Figure 15:
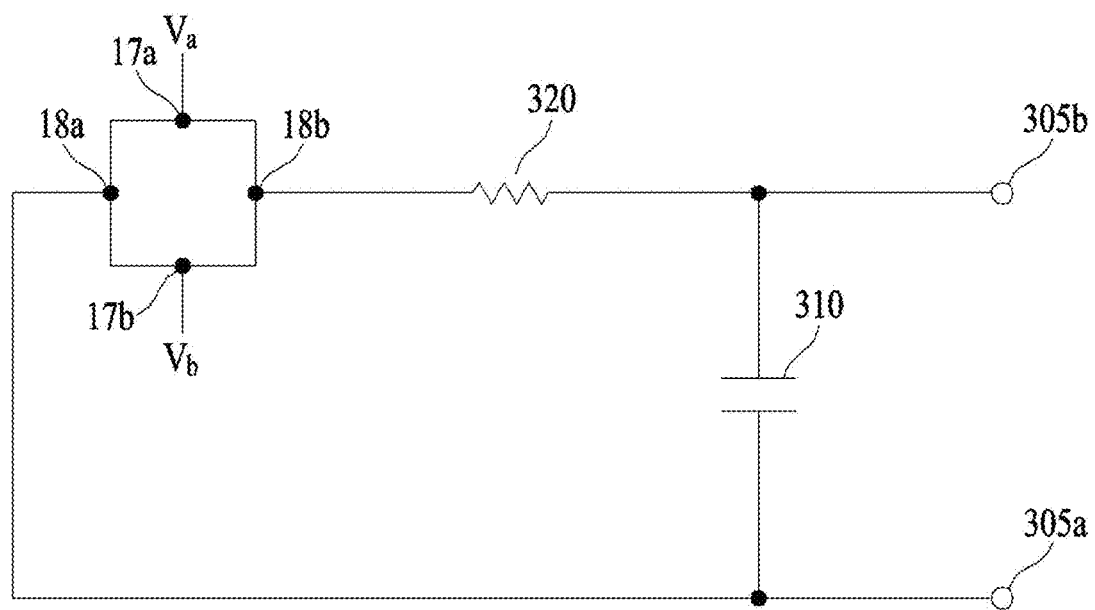
FIG. 15 shows electric connection relations among a first position sensor, capacitor and resistor according to another embodiment.

FIG. 15 shows electric connection relations among the first position sensor 170, the capacitor 310 and the resistor 320 according to another embodiment. For the sake of brief description with reference to the drawings, the same or equivalent components shown in FIG. 13 may be provided with the same reference numbers, and description thereof will be repeated schematically or omitted.

Referring to FIG. 15, a lens drive unit according to another embodiment may further include a resistor 320 connected between the output terminal 18b of the first position sensor 170 and one end 305b of the capacitor 310. The resistor 320 may be disposed or mounted on the circuit board 250. According to another embodiment, the resistor 320 may be embodied as included in the circuit board 250.

By configuring a low band pass filter with the capacitor 310 and the resistor 320, output signals outputted from the output terminals 18a and 18b of the first position sensor 170 are filtered through the low band pass filter. Therefore, PWM noise can be eliminated and feedback closed-loop AF performance of the first position sensor 170 can be improved.

Figure 16:
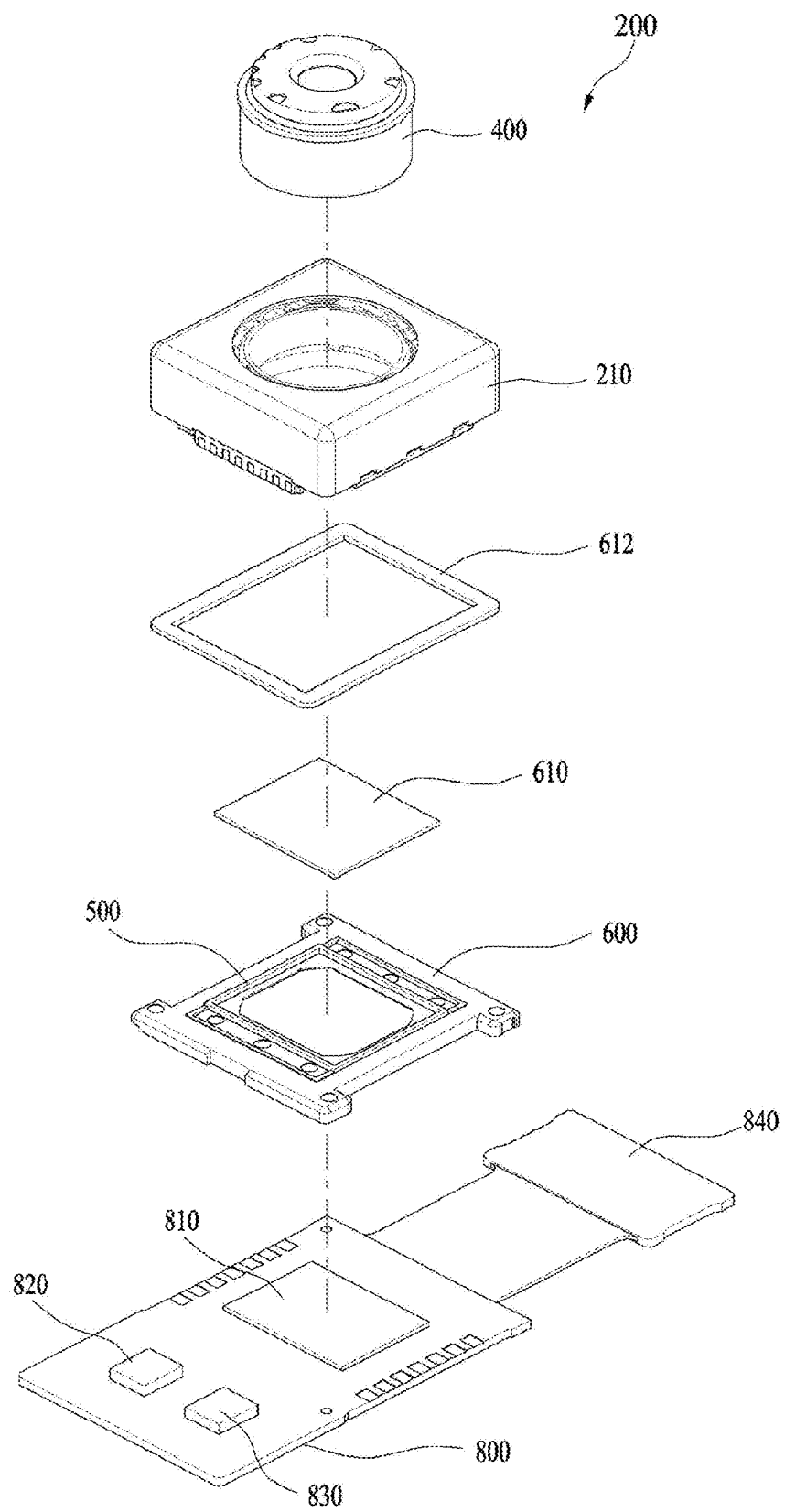
FIG. 16 is an exploded perspective diagram of a camera module according to an embodiment.

FIG. 16 is an exploded perspective diagram of a camera module 200 according to an embodiment.

Referring to FIG. 16, a camera module 200 may include a lens barrel 400, a lens drive unit 100, an adhesive member 612, a filter 610, a first holder 600, a second holder 800, an image sensor 810, a motion sensor 820, an optical image stabilization controller 830, and a connector 840.

The lens barrel 400 may be installed in the bobbin 110 of the lens drive unit 100 and equipped with a lens. According to another embodiment, a lens may be directly installed in the bobbin 110.

The first holder 600 may be disposed under the base 210 of the lens drive unit 100. The filter 610 is installed in the first holder 600. And, the first holder 600 may include a protrusion 500 having the filter 610 seated thereon.

By the adhesive member 612, the base 210 of the lens drive unit 100 can be joined or attached to the first holder 600. The adhesive member 612 may play a role in inhibiting particles from entering the lens drive unit 100 as well as an adhesive role.

For example, the adhesive member 612 may include epoxy, thermosetting adhesive, UV-setting adhesive, etc.

By the filter 610, light on a specific frequency band in light passing through the lens or the lens barrel 400 can be inhibited from being incident on the image sensor 810. The filter 610 may include a UV cutoff filter, by which the embodiment is non-limited. Here, the filter 610 may be disposed parallel to the x-y plane.

A hollow may be formed in a portion of the first holder 600 having the filter mounted thereon so that light passing through the filter 610 can be incident on the image sensor 810.

The second holder 800 is disposed under the first holder 600, and the image sensor 810 can be mounted on the second holder 600. As the light having passed through the filter 610 is incident on the image sensor 810, an image included in the incident light is formed in the image sensor 810.

The second holder 800 may be provided with various circuits, devices, a controller and the like in order to send the image formed in the image sensor 810 to an external device by converting the image into an electrical signal.

The second holder 800 can be embodied by a circuit board. On this circuit board, the image sensor can be mounted, a circuit pattern can be formed, and various devices are joined.

The image sensor 810 may receive an image included in the light incident through the lens drive unit 100 and convert the received image into an electrical signal.

The filter 610 and the image sensor 810 can be disposed by being spaced apart from each other so as to confront each other in the first direction.

The motion sensor 820 is mounted on the second holder 800 and can be electrically connected to the optical image stabilization controller 830.

The motion sensor 820 outputs a rotating angular speed information according to motion of the camera module 200. The motion sensor 820 may be embodied by a 2- or 3-axis gyro sensor or an angular speed sensor. The motion sensor 820 may be configured separately from the optical image stabilization controller 830, by which the embodiment is non-limited.

According to another embodiment, the motion sensor 820 may be configured so as to be included in the optical image stabilization controller 830.

The OIS (optical image stabilization) controller 830 is mounted on the second holder 800 and can be electrically connected to the first coil 120, the first position sensor 170, the second position sensor 240 and the second coil 230 of the lens drive unit 100.

For example, the second holder 800 can be electrically connected to the circuit board 250 of the lens drive unit 100, and the OIS controller 830 mounted on the second holder 800 can be electrically connected to the first coil 120, the first position sensor 170, the second position sensor 240 and the second coil 230 via the terminals 251 of the circuit board.

Based on an output signal provided by the first position sensor 170 of the lens drive unit 100, the OIS controller 830 can perform autofocusing on the AF moving unit of the lens drive unit. Based on output signals provided by the second position sensor 240 of the lens drive unit 100, the OIS controller 830 can perform optical image stabilization (OIS) on the OIS moving unit of the lens drive unit 100.

The connector 840 is electrically connected to the second holder 800 and may have a port so as to be electrically connected to an external device.

Figure 17:
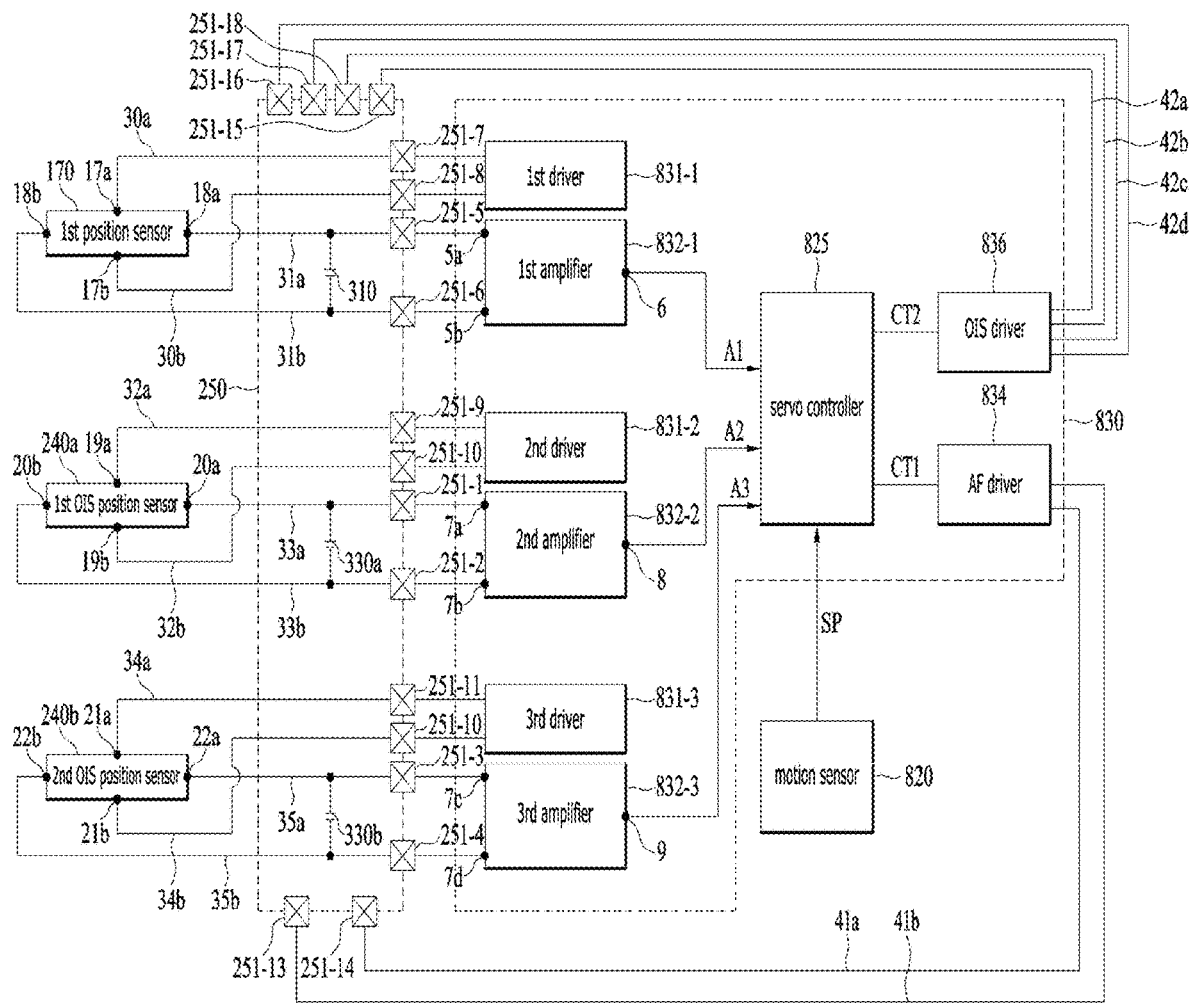
FIG. 17 shows one embodiment of connection relations among a first position sensor, second position sensor, capacitors and optical image stabilization controller of the camera module shown in FIG. 16.

FIG. 17 shows one embodiment of connection relations among the first and second position sensors 170, 240a and 240b, the capacitors 310, 330a and 330b and the OIS controller 830 of the camera module 200 shown in FIG. 16.

Referring to FIG. 17, input terminals 17a and 17b of the first position sensor 170 can be electrically connected to terminals 251-7 and 251-8 provided to the circuit board 250 through wirings 30a and 30b provided to the circuit board 250.

Output terminals 18a and 18b of the first position sensor 170 can be electrically connected to terminals 251-5 and 251-6 provided to the circuit board 250 through wirings 31a and 31b provided to the circuit board 250.

For example, the wirings 30a and 30b of the circuit board 250 can be connected to the support members electrically connected to the upper elastic members connected to the input terminals 17a and 17b of the first position sensor 170.

For example, the wirings 31a and 31b of the circuit board 250 can be connected to the support members electrically connected to the upper elastic members connected to the output terminals 18a and 18b of the first position sensor 170.

One end of the capacitor 310 is connected to the wiring 31a of the circuit board 250, and the other end can be connected to the wiring 31b of the circuit board 250.

Description of the capacitance of the capacitor 310, the cutoff frequency of the primary low band pass filter consisting of the internal resistor of the first position sensor and the capacitor 310, and their functions and effects, which are described in FIG. 13, is identically applicable to FIG. 17.

The first OIS position sensor 240a and the second OIS position sensor 240b may include first and second input terminals 19a and 19b and 21a and 21b and first and second output terminals 20a and 20b and 22a and 22b, respectively.

The first and second input terminals 19a and 19b and 21a and 21b of the first OIS position sensor 240a and the second OIS position sensor 240b can be electrically connected to the terminals 251-9 and 251-10 and 251-11 and 251-12 of the circuit board 250 through wirings 32a and 32b and 34a and 34b provided to the circuit board 250, respectively.

The terminals 251-9 and 251-10 and 251-11 and 251-12 of the circuit board 250 can be provided with signals for driving the first OIS position sensor 240a and the second OIS position sensor 240b from the OIS controller 830, respectively.

The first OIS position sensor 240a and the second OIS position sensor 240b may sense strength of a magnetic field according to a motion of the housing 140 and output an output signal or a sensing signal according to the sensing result to the first and second output terminals 20a and 20b and 22a and 22b, respectively.

The output terminals 20a and 20b of the first OIS position sensor 240a can be electrically connected to the terminals 251-1 and 251-2 provided to the circuit board 250 through the wirings 33a and 33b provided to the circuit board 250.

The output terminals 22a and 22b of the second OIS position sensor 240b can be electrically connected to the terminals 251-3 and 251-4 provided to the circuit board 250 through the wirings 335 and 35b provided to the circuit board 250.

The lens drive unit 100 according to the embodiment may further include a capacitor 330a connected in parallel to the output terminals 20a and 20b of the first OIS position sensor 240a and a capacitor 330b connected in parallel to the output terminals 22a and 22b of the second OIS position sensor 240b.

Capacitance of each of the capacitors 330a and 330b may range 1 nF~100 nF and a resistance of an internal resistor of each of the first and second OIS position sensors may range 500 ohm (Ω)~1000 ohm (Ω).

And, a cutoff frequency of the primary low band pass filter consisting of the internal resistor of each of the first and second OIS position sensors and the corresponding capacitor 330a/330b may range 1.6 [KHz]~318.3 [KHz].

For example, in order to eliminate PWM noise due to crosstalk between the second coil 230 and the first and second OIS position sensors 240a and 240b, the capacitance of the capacitor 330a/330b may range 10 nF 50 nF and the cutoff frequency may range 3.19 [KHz]~31.9 [KHz].

PWM noise due to crosstalk between the second coil 230 and the first and second OIS position sensors 240a and 240b can be eliminated from output signals of the first and second OIS position sensors 240a and 240b, and feedback closed-loop AF performance of the first and second OIS position sensors 240a and 240b can be improved by reducing a gain in a frequency region over 1 KHz in audible frequency.

For example, one end of the capacitor 330a can be connected to the wiring 33a of the circuit board 250, and the other end of the capacitor 330a may be connected to the wiring 33b of the circuit board 250.

Moreover, for example, one end of the capacitor 330b can be connected to the wiring 35a of the circuit board 250, and the other end of the capacitor 330b may be connected to the wiring 35b of the circuit board 250.

Each of the capacitors 330a and 330b can be disposed or mounted as a chip or condenser on the circuit board 250, by which the embodiment is non-limited. For example, each of the capacitors 330a and 330b may be embodied as included in the circuit board 250. For example, each of the capacitors 330a and 330b may include a capacitor consisting of a first conductive layer, a second conductive layer, and a first insulating layer (e.g., dielectric) disposed between the first and second conductive layers, which are formed on the circuit board 250.

The OIS controller 830 may include first to third drivers 831-1 to 831-3, first to third amplifiers 832-1 to 832-3, a servo controller 825, an OIS driver 843, and an AF driver 836.

The first driver 831-1 provides a drive signal (e.g., a drive power) for driving the first position sensor 170. For example, the first driver 831-1 may provide a drive signal to the terminals 251-7 and 251-8 of the circuit board 250.

The second driver 831-2 provides a drive signal (e.g., a drive power) for driving the first OIS position sensor 240a. For example, the second driver 831-2 may provide a drive signal to the terminals 251-9 and 251-10 of the circuit board 250.

The third driver 831-3 provides a drive signal (e.g., a drive power) for driving the second OIS position sensor 240b. For example, the third driver 831-3 may provide a drive signal to the terminals 251-11 and 251-12 of the circuit board 250.

The first amplifier 832-1 amplifies an output signal of the first position sensor 170 and outputs a first amplified signal A1 according to the amplification result. For example, the first amplifier 832-1 may include first and second input terminals 5a and 5b connected to the terminals 251-5 and 251-6 of the circuit board 250 and an output terminal 6 outputting a first amplified signal A1.

The capacitor 310 may be connected in parallel to the output terminals 5a and 5b of the first position sensor 170 and the first and second input terminals 5a and 5b of the first amplifier 832-1.

The second amplifier 832-2 amplifies an output signal of the first OIS position sensor 240a and outputs a second amplified signal A2 according to the amplification result. For example, the second amplifier 832-2 may include first and second input terminals 7a and 7b connected to the terminals 251-1 and 251-2 of the circuit board 250 and an output terminal 8 outputting a second amplified signal A2.

The capacitor 330a may be connected in parallel to the output terminals 20a and 20b of the first OIS position sensor 240a and the first and second input terminals 7a and 7b of the second amplifier 832-2.

The third amplifier 832-3 amplifies an output signal of the second OIS position sensor 240b and outputs a third amplified signal A3 according to the amplification result. For example, the third amplifier 832-3 may include first and second input terminals 7c and 7d connected to the terminals 251-3 and 251-4 of the circuit board 250 and an output terminal 9 outputting a third amplified signal A3.

For example, each of the first to third amplifiers 832-1 to 832-3 may be embodied by an operational amplifier, by which the embodiment is non-limited. The first and second input terminals of each of the first to third amplifiers 832-1 to 832-3 may include an inverting input terminal and a non-inverting input terminal of the operational amplifier, by which the embodiment is non-limited.

The capacitor 330b may be connected in parallel to the output terminals 22a and 22b of the second OIS position sensor 240b and the first and second input terminals 7c and 7d of the third amplifier 832-3.

Based on the first amplified signal A1 and the rotating angular speed information SP provided by the motion sensor 820, the servo controller 825 outputs a first control signal CT1 for controlling the AF driver 834.

Based on the second and third amplified signals A1 and A2 and the rotating angular speed information SP provided by the motion sensor 820, the servo controller 825 outputs a second control signal CT2 for controlling the OIS driver 836.

Based on the first control signal CT1, the AF driver 834 outputs a first drive signal for driving the first coil 120 to an output end. The first drive signal may include an AC signal or AC and DC signals. For example, the first drive signal may include a PWM signal and a frequency of the PWM signal may range 0.1 MHz~10 MHz.

Through wirings 41 and 41b, the output end of the AF driver 834 maybe electrically connected to the terminals 251-13 and 251-14 of the circuit board 250. The wirings 41a and 41b may be provided to the second holder 800 of the camera module 200 in FIG. 16. For example, the terminals 251-13 and 251-14 of the circuit board 250 can be electrically connected to the first and second lower elastic members 160-1 and 16-2 having the first coil 120 connected thereto.

Based on the second control signal CT2, the OIS driver 836 outputs second drive signals for driving the first OIS coil 240a and the second OIS coil 240b to an output end.

Each of the second drive signals may include an AC signal or AC and DC signals. For example, each of the second drive signals may include a PWM signal and a frequency of the PWM signal may range 0.1 MHz~10 MHz.

Through wirings 42a to 42d, the output end of the OIS driver 836 maybe electrically connected to the terminals 251-15 to 251-18 of the circuit board 250.

The wirings 42a to 42d may be provided to the second holder 800 of the camera module 200 in FIG. 16. For example, the terminals 251-15 to 251-18 of the circuit board 250 can be electrically connected to the second coils 230-1 to 230-4.

In FIG. 16 and FIG. 17, the motion sensor 820 may be embodied separately from the OIS controller 830, by which the embodiment is non-limited. According to another embodiment, the motion sensor 820 may be embodied as included in the OIS controller 830.

Figure 18:
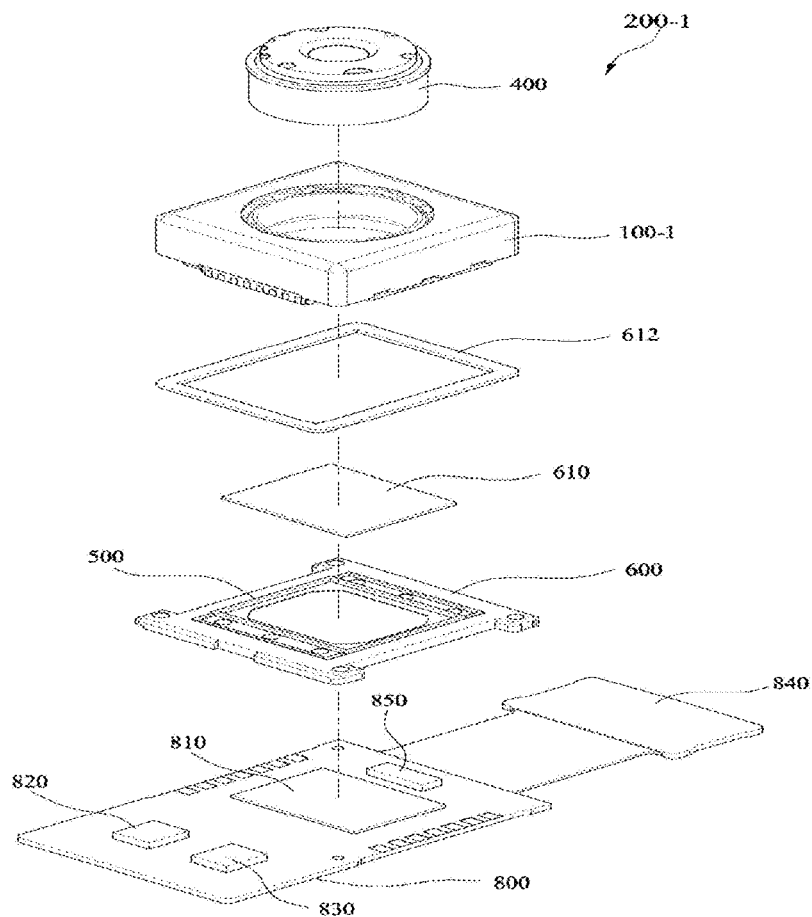
FIG. 18 is an exploded perspective diagram of a camera module according to another embodiment.

FIG. 18 is an exploded perspective diagram of a camera module according to another embodiment. For the sake of brief description with reference to the drawings, the same or equivalent components shown in FIG. 16 may be provided with the same reference numbers, and description thereof will be repeated schematically or omitted.

Referring to FIG. 18, a camera module 200-1 may have the same configuration of the former camera module 200 shown in FIG. 16 except a lens drive unit 100-1 and a filter unit 850. The lens drive unit 100-1 of FIG. 19 may have the configuration of the former lens derive unit 100 shown in FIG. 1, from which the capacitor 310 is removed.

The camera module 200-1 shown in FIG. 10 may include a filter unit 850 disposed on the second holder 800.

The filter unit 850 is disposed on the second holder 800 and may include a capacitor connected in parallel to the first and second output terminals 18a and 18b of the first position sensor 170.

The inner resistor of the first position sensor 170 described in FIG. 13 and the capacitor of the filter unit 850 an may configure a primary low band pass filter, e.g., an RC filter. The description of the capacitance of the capacitor, the internal resistance of the first position sensor, and the cutoff frequency of the primary low band pass filter is identically applicable to the filter unit 850 of FIG. 18.

When the first coil 120 is driven with a PWM signal, the filter unit 850 can eliminate PWM noise from an output signal of the first position sensor 170 and is able to feedback closed-loop AF performance of the first position sensor 170.

Figure 19:
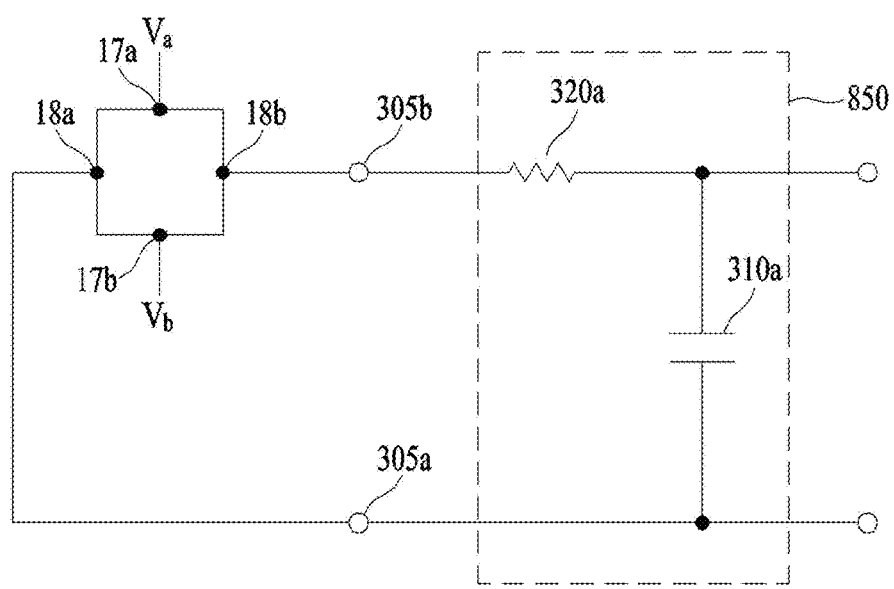
FIG. 19 shows one embodiment of a filter unit shown in FIG. 18.

FIG. 19 shows one embodiment of a filter unit shown in FIG. 18.

Referring to FIG. 19, the filter unit 850 may include a capacitor 310a and a resistor 320a disposed on the second holder 800.

The resistor 320a may be mounted on the second holder 800 or embodied through a circuit pattern formed on the second holder 800. For example, one end of the resistor 320a may be connected to one 18b of the first and second output terminals 18a and 18b of the first position sensor 170, and the other end of the resistor 320a may be connected to one end of the capacitor 310a. The capacitor 310a may be connected to the other end of the resistor 320a and the other one 18a of the first and second output terminals of the first position sensor 170.

The capacitor 310a and the resistor 320a may play a role as a low band pass filter that filters output signals outputted from the output terminals 18a and 18b of the first position sensor 170.

Or, when an internal resistor exists in the first position sensor 170, the capacitor 310a, the resistor 320a and the internal resistor of the first position sensor 170 may play a role as a low band pass filter.

Unlike the embodiments shown in FIG. 11 and FIG. 18, the capacitor connected in parallel to the first and second output terminals 18a and 18b of the first position sensor 170 may be disposed on the sensor board 180 shown in FIG. 5C.

For example, the capacitor may be disposed on the second segment 182b of the body 182 of the sensor board 180 so as to be connected in parallel to the elastic member contact portions (e.g., 184-1, 184-2) connected electrically to the first and second output terminals 18a and 18b of the first position sensor 170.

Moreover, the capacitor may be embodied as included in the sensor board 180. For example, the sensor board 180 may include a capacitor consisting of a first conductive layer, a second conductive layer, and a first insulating layer (e.g., dielectric) disposed between the first and second conductive layers.

Figure 20:
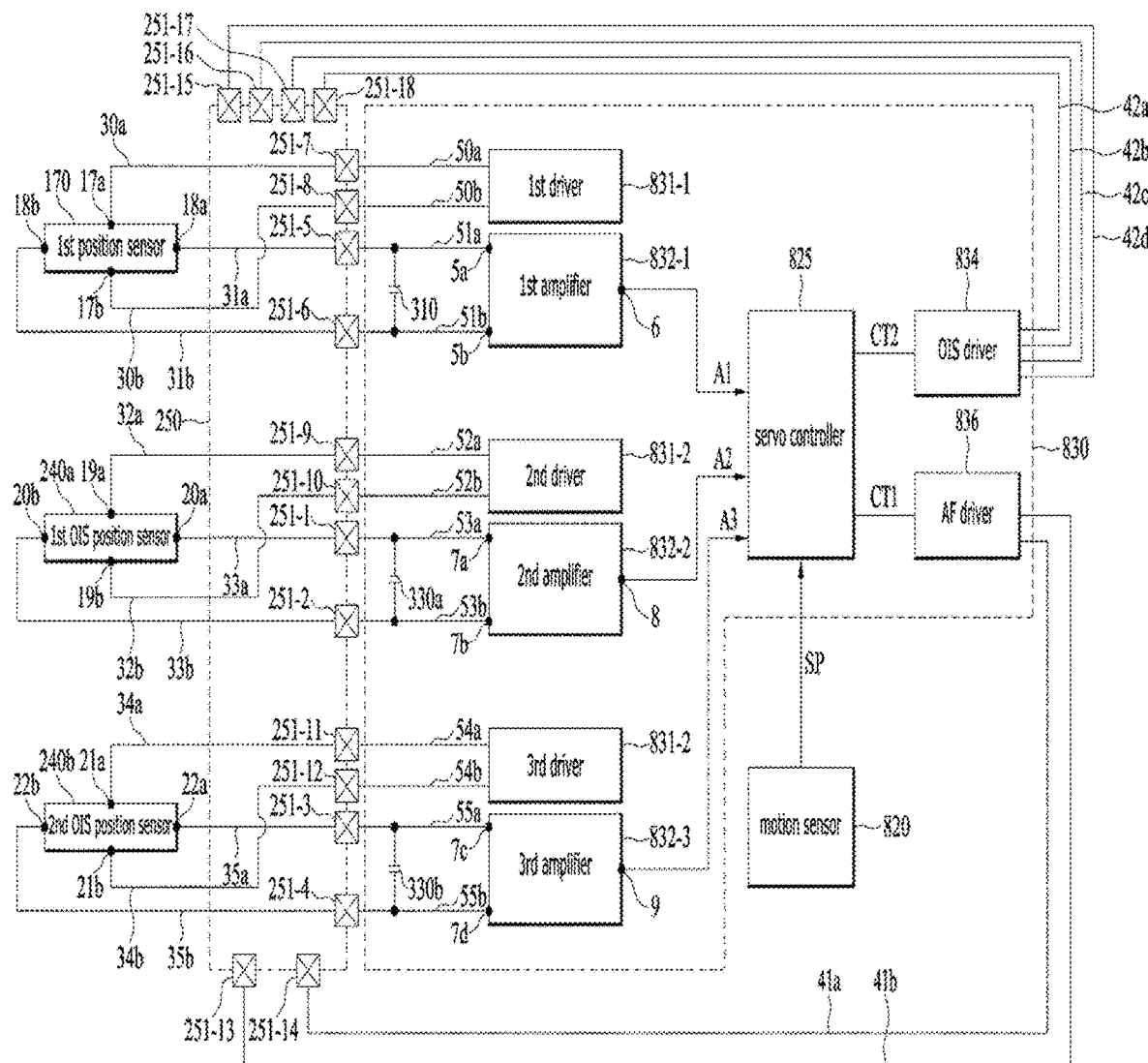
FIG. 20 shows one embodiment of connection relations among a first position sensor, second position sensor, capacitors and optical image stabilization control unit of the camera module shown in FIG. 18.

FIG. 20 shows one embodiment of connection relations among the first and second position sensors 170, 240a and 240b, the capacitors 310', 330a' and 330b' and the OIS controller 830' of the camera module 200-1 shown in FIG. 18.

The same or equivalent components shown in FIG. 17 may be provided with the same reference numbers, and description thereof will be repeated schematically or omitted.

Referring to FIG. 20, first to third drivers 831-1 to 831-3 can be connected to the terminals 251-7 to 251-12 of the lens drive unit 100-1 through wirings 50a, 50b, 52a, 52b, 54a and 54b provided to the second holder.

First to third amplifiers 832-1 to 832-3 may be connected to the terminals 251-1 to 251-6 of the circuit board 250 of the lens drive unit 110-1 through wirings 51a, 51b, 53a, 53b, 55a and 55b provided to the second holder 800.

A capacitor 310' is disposed on the second holder 800 of the camera module 200-1 and can be connected in parallel to the terminals 251-5 and 251-6 of the circuit board 250 connected to the first and second output terminals 18a and 18b of the first position sensor 170 and the first and second input terminals 5a and 5b of the first amplifier 832-1.

For example, one end of the capacitor 310' is connected to the wiring 51a of the second holder 800 and the other end of the capacitor 310' can be connected to the wiring 51b of the second holder 800.

The capacitor 330a' is disposed on the second holder 800 of the camera module 200-1, and can be connected in parallel to the terminals 251-1 and 251-2 of the circuit board 250 connected to the first and second output terminals 20a and 20b of the first OIS position sensor 240a and the first and second input terminals 7a and 7b of the second amplifier 832-2.

For example, one end of the capacitor 330a' is connected to the wiring 53a of the second holder 800 and the other end of the capacitor 330a' can be connected to the wiring 53b of the second holder 800.

The capacitor 330b' is disposed on the second holder 800 of the camera module 200-1, and can be connected in parallel to the terminals 251-3 and 251-4 of the circuit board 250 connected to the first and second output terminals 22a and 22b of the second OIS position sensor 240b and the first and second input terminals 7c and 7d of the third amplifier 832-3.

For example, one end of the capacitor 330b' is connected to the wiring 55a of the second holder 800 and the other end of the capacitor 330b' can be connected to the wiring 55b of the second holder 800.

Figure 21:
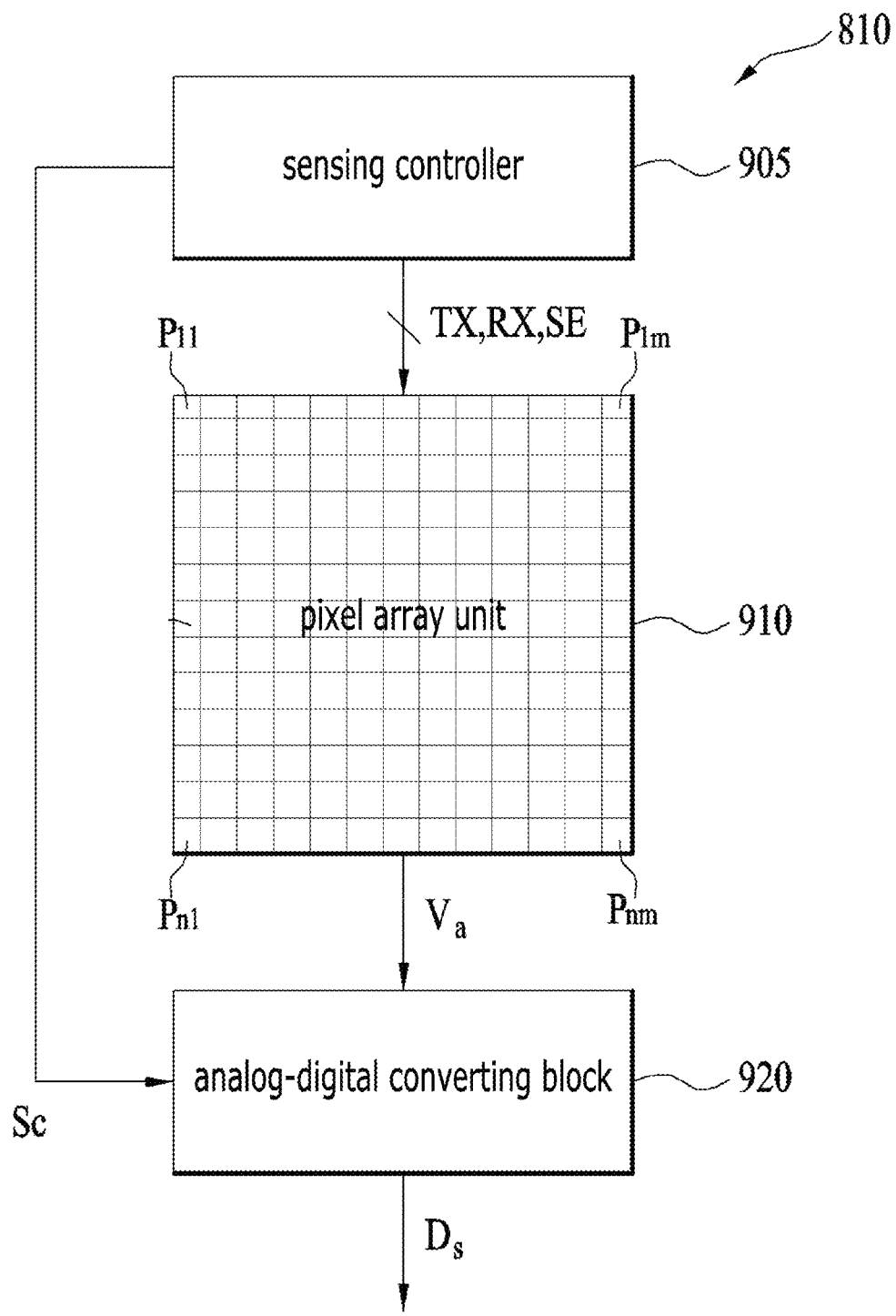
FIG. 21 is a block diagram of an image sensor shown in FIG. 16 and FIG. 18 according to one embodiment.

FIG. 21 is a block diagram of the image sensor 810 shown in FIG. 16 and FIG. 18 according to one embodiment.

Referring to FIG. 21, an image sensor 100 includes a sensing controller 905, a pixel array 910 and an analog-digital converting block 920.

The sensing controller 905 outputs control signals (e.g., reset signal RX, transmitted signal TX, and selection signal SX) for controlling transistors included in the pixel array 910 and control signals Sc for controlling the analog-digital converting block 130.

The pixel array 910 includes a plurality of unit pixels P11 to Pnm (n: natural number>1, m: natural number>1), and a plurality of the unit pixels P11 to Pnm can be arrayed to have a matrix form consisting of rows and columns. Each of the unit pixels P11 to Pnm may include a photoelectric transformation element that senses light to transform into an electrical signal.

The pixel array 120 may include sensing lines connected to output ends of a plurality of the unit pixels P11 to Pnm.

For example, each of the unit pixels P11 to Pnm may include a photodiode, a transfer transistor, a reset transistor, a drive transistor and a select transistor, by which the embodiment is non-limited. The number of transistors included in the unit pixel is not limited to 4 and may be 3 or 5.

The photodiode absorbs light and generates electric charge by the absorbed light.

The transfer transistor can send electric charge generated by the photodiode to a sensing node (e.g., a floating diffusion region) in response to a transmitted signal TX. The reset transistor may reset a unit pixel in response to a reset signal RX. The drive transistor may be controlled in response to a voltage of the sensing node, embodied by a source follower, and play a role as a buffer. The select transistor may be controlled by a selection signal SE and output a sensing signal Va to an output terminal of the unit pixel.

The analog-digital converting block 920 samples the sensing signal VA that is an analog signal outputted from the pixel array 910 and then converts the sampled sensing signal into a digital signal Ds. The analog-digital converting block 920 can perform correlated double sampling (CDS) to eliminate fixed pattern noise unique to a pixel.

The sensing controller 905 and the analog-digital converting block 920 may be embodies separately from the OIS controller 830, by which the embodiment is non-limited. The sensing controller 905, the analog-digital converting block 920 and the OIS controller 830 may be embodied by a single controller.

Figure 22:
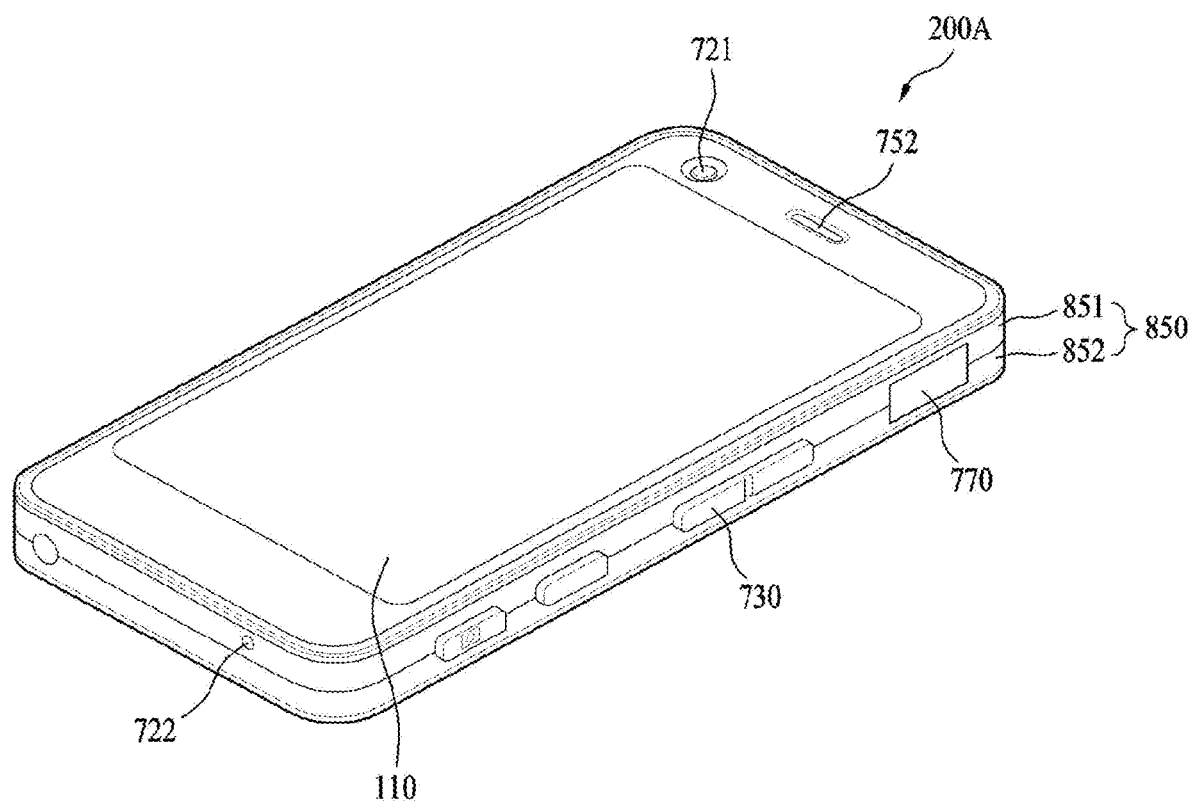
FIG. 22 is a perspective diagram of a portable terminal according to an embodiment.
Figure 23:
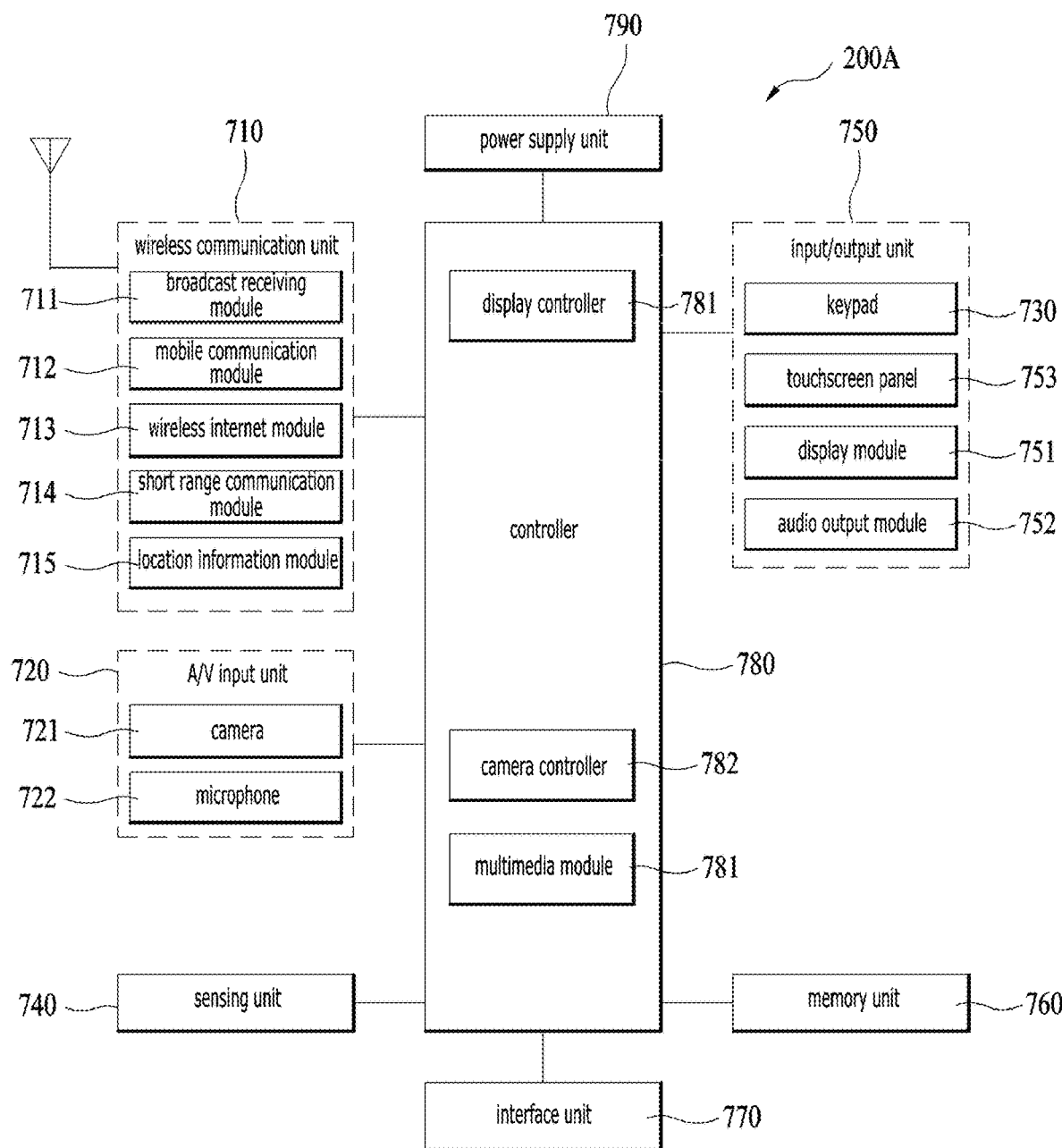
FIG. 23 is a configurational diagram of the portable terminal shown in FIG. 22.

FIG. 22 is a perspective diagram of a portable terminal 200A according to an embodiment. FIG. 23 is a configurational diagram of the portable terminal shown in FIG. 22.

Referring to FIG. 22 and FIG. 23, a portable terminal 200A (hereinafter called 'terminal') may include a body 850, a wireless communication unit 710, an A/V input unit 720, a sensing unit 740, an input/output unit 750, a memory unit 760, an interface unit 770, a controller 780 and a power supply unit 790.

The body 850 shown in FIG. 22 is a bar type, by which the embodiment is non-limited. The body 850 may include one of various structures such as a slide type, a folder type, a swing type, a swivel type and the lie, in which two or more sub-bodies are slidably joined to each other.

The body 850 may include a case (e.g., casing, housing, cover, etc.). For example, the body 850 may be divided into a front case 851 and a rear case 852. In a space formed between the front and rear cases 851 and 852, various electronic parts of the terminal can be built.

The wireless communication unit 710 can be configured by including at least one module capable of wireless communication between the terminal 200A and a wireless communication system or between the terminal 200A and a network on which the terminal 200A is located. For example, the wireless communication unit 710 may include a broadcast receiving module 711, a mobile communication module 712, a wireless internet module 713, a short range communication module 714 and a location information module 715.

The A/V (audio/video) input unit 720 is provided for an audio or video signal input and may include a camera 721, a microphone 722, etc.

The camera 721 may include the camera module 200/200-1 according to the embodiment shown in FIG. 16/FIG. 17.

The sensing unit 740 senses such a current state of the terminal 200A as an open/closed state of the terminal 200A, a location of the terminal 200A, a presence or non-presence of contact with a user, a bearing of the terminal 200A, acceleration/deceleration of the terminal 200A, and the like, and is then able to generate a sensing signal for controlling an operation of the terminal 200A. For example, if the terminal 200A is a slide phone type, the sensing unit 740 can sense whether the slide phone is open or closed. And, the sensing unit 740 is responsible for a sensing function related to a presence or non-presence of a power supply of the power supply unit 790, a presence or non-presence of a connection between the interface unit 770 and an external device, etc.

The input/output unit 750 is provided to generate an input or output related to visual sense, auditory sense, tactile sense or the like. The input/output unit 750 can generate input data for an operation control of the terminal 200A and display information processed by the terminal 200A.

The input/output unit 750 may include a keypad unit 730, a display module 751, an audio output module 752 and a touchscreen panel 753. The keypad unit 730 may generate input data according to a keypad input.

The display module 751 may include a plurality of pixels changing in color according to an electric signal. For example, the display module 751 may include at least one of a liquid crystal display, a thin film transistor-liquid crystal display, an organic light-emitting diode, a flexible display, and a 3D display.

The audio output module 752 may output audio data received from the wireless communication unit 710 in a call signal receiving mode, a call mode, a recording mode, a voice recognition mode, a broadcast receiving mode, etc., or output audio data stored in the memory unit 760.

The touchscreen panel 753 can transform variation of electrostatic capacitance generated according to a user's touch to a specific region of a touchscreen into an electrical input signal.

The memory unit 760 may store programs for processing and control of the controller 780 and temporarily store inputted/outputted data (e.g., phonebook, message, audio, still image, photo, video, etc.). For example, the memory unit 760 may store images (e.g., photos, videos, etc.) captured by the camera 721.

The interface unit 770 plays a role as a passage connected to an external device connected to the terminal 200A. The interface unit 770 receives data from an external device or is supplied with a power and then delivers the received data or the supplied power to the respective components in the terminal 200A. And, the interface unit 770 enables data inside the terminal 200A to be transmitted to the external device. For example, the interface unit 770 may include a wired/wireless headset port, an external charger port, a wired/wireless data port, a memory card port, a port connecting an identification module provided device, an audio I/O (input/output) port, a video I/O (input/output) port, an earphone port, etc.

The controller 180 can control overall operations of the terminal 200A. For example, the controller 780 can perform the control and processing relevant to voice call, data communication, video call and the like.

The controller 780 may have a multimedia module 781 for multimedia playback. The multimedia module 781 may be embodied within or separately from the controller 780.

The controller 780 may include a display controller 781A generating display control signals for driving the display unit 751 and a camera controller 782 generating camera control signals for driving the camera 721.

The controller 780 may perform pattern recognition processing for recognizing a handwriting/picture-drawing input applied to the touchscreen as a text/image.

The power supply unit 790 receives an external or internal power under the control of the controller 780 and is then able to supply a power necessary for an operation of each component.

The features, structures, effects and the like described in the above embodiments are included in at least one embodiment of the present invention and should be non-limited to one embodiment only. The features, structures, effects and the like exampled in one embodiment can be combined or modified by those skilled in the art for other embodiments.

It will be appreciated by those skilled in the art that various combinations and modifications can be made in the present invention without departing from the spirit or scope of the inventions.

INDUSTRIAL APPLICABILITY

The embodiment is applicable to a lens drive unit, camera module and optical instrument, by which noise due to crosstalk with a first coil is eliminated as well as feedback closed-loop performance of a first position sensor is improved.

The invention claimed is:

1. A camera module comprising:
   a lens barrel;
   a lens drive unit for moving the lens barrel;
   a first circuit board electrically connected to lens drive unit;
   an image sensor disposed on the first circuit board; and
   a first capacitor disposed on the first circuit board,
   wherein the lens drive unit comprises:
   a housing;
   a bobbin disposed in the housing;
   a first coil disposed on the bobbin;
   a first magnet disposed on the housing;
   a first position sensor disposed on the housing and comprising first and second input terminals and first and second output terminals;
   an upper elastic member coupled to an upper portion of the bobbin and an upper portion of the housing;
   a second circuit board disposed under the housing;
   a second coil disposed on the second circuit board and facing the first magnet; and
   a support member electrically connecting the second circuit board and the upper elastic member,
   wherein the upper elastic member comprises a first upper elastic member electrically connected to the first input terminal, a second upper elastic member electrically connected to the second input terminal, a third upper elastic member electrically connected to the first output terminal, and a fourth upper elastic member electrically connected to the second output terminal,
   wherein one end of the first capacitor is electrically connected to the third upper elastic member and another end of the first capacitor is electrically connected to the fourth upper elastic member.

2. The camera module of claim 1, wherein the support member comprises a first wire coupled to the first upper elastic member and a second wire coupled to the second upper elastic member,
   wherein one end of the first capacitor is electrically connected to the first wire and another end of the first capacitor is electrically connected to the second wire.

3. The camera module of claim 2, wherein the second circuit board comprises a first terminal electrically connected to the first wire and the second terminal electrically connected to the second wire.

4. The camera module of claim 3, wherein one end of the first capacitor is electrically connected to the first terminal of the second circuit board and another end of the first capacitor is electrically connected to the second terminal of the second circuit board.

5. The camera module of claim 1, wherein the first capacitor is connected in parallel to the first and second output terminals of the first position sensor.

6. The camera module of claim 1, wherein the first elastic member electrically connects the first output terminal of the first position sensor and the first wire, and the second elastic member electrically connects the second output terminal of the first position sensor and the second wire.

7. The camera module of claim 2, wherein the upper elastic member comprises a third upper elastic member electrically connected to the first input terminal of the first position sensor and a fourth upper elastic member electrically connected to the second input terminal of the first position sensor.

8. The camera module of claim 7, wherein the support member comprises a third wire electrically connected to the third upper elastic member and a fourth wire electrically connected to the fourth upper elastic member.

9. The camera module of claim 1, wherein capacitance of the first capacitor is 10 nF~50 nF.

10. The camera module of claim 1, wherein the second coil comprises a circuit member disposed under the second circuit board and coil units formed at the circuit member.

11. The camera module of claim 1, comprising:
a base disposed under the second circuit board; and
a second position sensor disposed between the second circuit board and the base,
wherein the second position sensor is configured to sense strength of a magnetic field of the first magnet according to a movement of the housing.

12. The camera module of claim 1, comprising a second magnet disposed on the bobbin, and
wherein the first position sensor is disposed on the housing.

13. The camera module of claim 1, wherein the first position sensor includes an internal resistor, and wherein resistance of the internal resistor of the first position sensor is 500 ohm ($\Omega$)~1000 ohm ($\Omega$).

14. The camera module of claim 1, comprising a lower elastic member coupled to a lower portion of the bobbin and a lower portion of the housing.

15. The camera module of claim 1, comprising fifth and sixth upper elastic members electrically connected to the first coil.

16. The camera module of claim 15, wherein the support member comprises a fifth wire electrically connecting the fifth upper elastic member and a sixth wire electrically connecting the sixth upper elastic member.

17. The camera module of claim 1, wherein the first magnet comprises four magnet units, and the second coil comprises four coil units corresponding to the four magnet units.

18. The camera module of claim 11, comprising a second capacitor disposed on the first circuit board,
wherein the second position sensor comprises first and second output terminals, and wherein the second capacitor is connected in parallel to the first and second output terminals of the second position sensor.

19. A camera module comprising:
a lens barrel;
a lens drive unit for moving the lens barrel;
a first circuit board electrically connected to lens drive unit;
an image sensor disposed on the first circuit board; and
a capacitor disposed on the first circuit board,
wherein the lens drive unit comprises:
a housing;
a bobbin disposed in the housing;
a first coil disposed on the bobbin;
a first magnet disposed on the housing;
a first position sensor disposed on the housing and comprising first and second input terminals and first and second output terminals;
an upper elastic member coupled to an upper portion of the bobbin and an upper portion of the housing and comprising a first upper elastic member coupled to the first output terminal of the first position sensor and a second upper elastic member coupled to the second output terminal of the first position sensor;
a second circuit board disposed under the housing and comprising first and second terminals electrically connected to the first circuit board;
a second coil disposed on the second circuit board and facing the first magnet; and
a support member comprises a first wire coupled to the first upper elastic member and a second wire coupled to the second upper elastic member,
wherein the first terminal of the second circuit board is electrically connected to the first wire and the second terminal of the second circuit board is electrically connected to the second wire, and
wherein one end of the capacitor is electrically connected to the first terminal of the second circuit board, and another end of the capacitor is electrically connected to the second terminal of the second circuit board.

20. A phone comprising:
a display module including a plurality of pixels; and
the camera module according to claim 1.

* * * * *